United States Patent

Farris et al.

[11] Patent Number: 6,154,207
[45] Date of Patent: Nov. 28, 2000

[54] INTERACTIVE LANGUAGE EDITING IN A NETWORK BASED VIDEO ON DEMAND SYSTEM

[75] Inventors: Robert D. Farris, Sterling; Geoffrey Michael Harton, Herndon, both of Va.

[73] Assignee: Bell Atlantic Network Services, Inc., Arlington, Va.

[21] Appl. No.: 08/362,318

[22] Filed: Dec. 22, 1994

[51] Int. Cl.[7] .................................................. G06F 17/00
[52] U.S. Cl. .................................. 345/328; 345/302
[58] Field of Search ........................... 395/159, 155, 395/161, 154, 327, 328, 972, 978, 806, 807; 345/327, 328, 972, 978, 302

[56] References Cited

U.S. PATENT DOCUMENTS

| | | | |
|---|---|---|---|
| Re. 34,340 | 8/1993 | Freeman | 348/12 |
| 4,862,268 | 8/1989 | Campell et al. | 348/463 |
| 4,888,796 | 12/1989 | Olivo, Jr. | 379/101.01 |
| 4,930,160 | 5/1990 | Vogel | 348/5.5 |
| 4,943,932 | 7/1990 | Lark et al. | 706/60 |
| 5,014,125 | 5/1991 | Pocock et al. | 348/7 |
| 5,077,607 | 12/1991 | Johnson et al. | 348/13 |
| 5,093,718 | 3/1992 | Hoarty et al. | 348/7 |
| 5,109,482 | 4/1992 | Bohrman | 345/328 |
| 5,181,107 | 1/1993 | Rhoades | 348/13 |
| 5,195,135 | 3/1993 | Palmer | 380/241 |
| 5,204,947 | 4/1993 | Bernstein et al. | 345/357 |
| 5,220,420 | 6/1993 | Hoarty et al. | 348/12 |
| 5,223,924 | 6/1993 | Strubbe | 348/7 |
| 5,226,160 | 7/1993 | Waldron et al. | 709/324 |
| 5,261,041 | 11/1993 | Susman | 345/473 |
| 5,265,206 | 11/1993 | Shackelford et al. | 709/316 |
| 5,291,554 | 3/1994 | Morales | 380/211 |
| 5,297,249 | 3/1994 | Bernstein et al. | 345/356 |
| 5,297,279 | 3/1994 | Bannon et al. | 707/103 |
| 5,307,456 | 4/1994 | MacKay | 345/328 |
| 5,313,297 | 5/1994 | Fukui et al. | 348/7 |
| 5,315,703 | 5/1994 | Matheny et al. | 345/507 |
| 5,317,732 | 5/1994 | Gerlach, Jr. et al. | 707/104 |
| 5,319,455 | 6/1994 | Hoarty et al. | 348/7 |
| 5,321,514 | 6/1994 | Martinez | 348/723 |
| 5,434,678 | 7/1995 | Abecassis | 386/52 |
| 5,481,296 | 1/1996 | Cragun et al. | 348/13 |
| 5,524,195 | 6/1996 | Clanton, III et al. | 345/327 |
| 5,561,457 | 10/1996 | Cragun et al. | 348/13 |

OTHER PUBLICATIONS

B. Roberts et al., "Five Desktop Packages Take On The Challenge Of Digital Video," *Macweek* Special Report (Jun. 6, 1994) pp. 38–39.

R. Ford, "Digital Video Stretches the Macintosh Envelope", *Macweek* Special Report (Jun. 6, 1994) pp. 32–36.

C. Guglielmo, "Movie Makers Like Results From Mac–Produced Videos", *Macweek* Special Report (Jun. 6, 1994) pp. 33–36.

*Primary Examiner*—Crescelle N. dela Torre
*Attorney, Agent, or Firm*—McDermott, Will & Emery

[57] ABSTRACT

An authoring tool is utilized for authoring an interactive multimedia application which eliminates undesired language from an audio source. The application monitors either audio itself or text which accompanies the audio and temporarily stops the audio for a duration corresponding to that of the undesired language optionally replacing it with a beep.

2 Claims, 23 Drawing Sheets

| | EXECUTION/ PLAYBACK TIME | ACTION/OBJECT | BEGIN | END | TRACK OF ORIGIN |
|---|---|---|---|---|---|
| 700 | XXXX | RUN VIDEO ASSET 275 | XXXX | XXXX | VIDEO CHL 1 |
| 710 | XXXX | RUN VIDEO ASSET 703 | XXXX | XXXX | VIDEO CHL 2 |
| 720 | XXXX | SPECIAL EFFECT 15 (FADE CHL 1 TO CHL 2) | XXXX | | SPECIAL EFFECTS CHL 1 |
| 730 | XXXX | DISPLAY TEXT OVERLAY 120 | XXXX | XXXX | VIDEO CHL 1 |
| 740 | XXXX | DISPLAY OVERLAY 121 | XXXX | XXXX | VIDEO CHL 1 |
| 760 | XXXX | RUN VIDEO ASSET 132 | XXXX | END | |
| 770 | XXXX | LOAD & EXECUTE PROGRAM OBJECT 172 (CREATE YES/NO BUTTON SET WITH TEXT SPECIFIED AS A PARAMETER AND DETECT RESPONSE | | | |
| 780 | XXXX | END | | | |

INTERACTIVE LANGUAGE EDITING IN A NETWORK BASED VIDEO ON DEMAND SYSTEM

CROSS-REFERENCE TO RELATED APPLICATIONS

This Application is related to application Ser. No. 08/250,792, filed May 27, 1994, now U.S. Pat. No. 5,608,447, by inventors George A. Faray, John A. Bigham, Kenneth T. Brooks, Amos H. Lucas, Jr. and Colton C. O'Donoghue, Jr. and entitled FULL SERVICE NETWORK and to application Ser. No. 08/250,791, filed May 27, 1994, now U.S. Pat. No. 5,635,979, by inventors Eugene L. Lew, Henry G. Hudson, Jr. and Daniel O'Callaghan and entitled PROGRAMMABLE DIGITAL ENTERTAINMENT TERMINAL, both assigned to Bell Atlantic Network Services, Inc. The disclosures of both of these Applications are hereby incorporated by reference in their entirety.

TECHNICAL FIELD

The invention is directed to the field of computer systems and more particularly to computer systems for developing and delivering multimedia applications.

BACKGROUND ART

Television succeeds in the entertainment industry because it changes every day. Viewers demand something new and the cable and TV industry continuously delivers novelty using production oriented tools and methodologies.

Interactive computer programs such as video games, entertain for much the same reason. A user makes selections based on the information content of the display and provides feedback to the computer game program which feedback alters the course of the program.

Multimedia presentations stimulate viewers' senses utilizing a number of reproduction media such as large screen video projection systems, realistic audio reproduction systems producing three dimensional wrap around sound, light shows, smoke generators, temperature controls, motion and acceleration simulators, smell generators and the like. A multiplicity of these media can be combined to give very realistic presentations. Some presentations of this nature are found in amusements park simulations which give riders a sense of actually participating in the events being reproduced in multimedia.

With the development of video on demand system such as disclosed in the aforesaid pending Applications, a need has arisen to provide menus to assist a user, inter alia, in the selection of program materials available. In a similar application, one may wish to produce a variety of electronic catalogs from which a user can select items to purchase.

In the area of education, it is often desirable to not only present information to a student in multimedia format, by which learning is enhanced, but also to obtain feedback from the student by which the adequacy of a student's learning may be assessed. The content of the material presented to the student may be altered, based on the assessment to assist the student to overcome any deficiency in the state of his knowledge.

As another example, during delivery of a Presidential speech, one may desire to obtain immediate feedback of audience reaction to various portions of the speech.

Thus, the ability to integrate interactive functionality with other media to create an integrated interactive multimedia presentations or applications is highly desirable.

U.S. Pat. No. 5,307,456 to MacKay issued Apr. 26, 1994, discloses a multimedia production and authoring system in which the system assets and resources are interconnected by a real time local area network. The system utilizes a graphical user interface to create, define, edit and order elements for use in a multimedia production. However, typical of devices of this type, no provision is made for the integration of interactive resources into the presentation. Any interactivity would need to be added after completion of the final compositing, that is after all the objects which will constitute the multimedia application are assembled and integrated into a unitary application.

U.S. Pat. No. 5,317,732 to Gerloc et al. issued May 31, 1994, and entitled System For Relocating A Multimedia Presentation On A Different Platform By Extracting A Resource Map In Order To Re-map And Relocate Resources discloses a process for relocating a plurality of multimedia presentations from one memory to another memory. The patent apparently permits elementary computer programming to occur in the form of simple math expressions which can be integrated into course work. The patent addresses "interactive capabilities" but these appear to refer to the interactions between the program developer and the source materials which are inherent in any authoring tool rather than the kind of interaction which occurs between the end user and the developed multimedia application. The patent permits certain blocks of multimedia information which may repeat upon playback to be assembled in reusable subroutines.

Production of an interactive multimedia application (such as a movie, courseware, video games, menus and the like) is normally divided into three phases: pre-production, lasting typically three to four weeks; production, typically lasting four to seven weeks and post-production, typically lasting four to five weeks. If interactivity is needed between an end user and the multimedia presentation, an additional three to four weeks for product development and another four to six weeks for systems integration and testing can be expected. The total process, therefore, can be considered to routinely consume eighteen to twenty-six weeks.

The pre-production phase typically involves signing the agreement with the customer, logic design, schedule development and rapid prototyping. Rapid prototyping typically involves creation/acquisition of placeholder assets to represent assets to be produced, an interactive story board presentation to permit viewing the application at a high level and to permit a usability test, and casting and script writing. Rapid prototyping is a development methodology which permits a customer to see the overall functionality at a high level prior to commitment to a production budget.

The production phase consists of the acquisition or creation of graphical elements, video elements, audio elements, still images, filming and the like. During this time, the actual assets to be integrated into the final product are created.

In post-production, the raw assets are edited and portions of them combined. Audio mixing, digital editing, the application of text overlays and graphical elements are all combined or composited into an integrated multimedia presentation. Typically, after compositing, if interactivity is needed, the interactive programs are produced and integrated.

Such an 18–26 week development cycle is unsuited for development of multimedia menus for video on demand service because program offerings change rapidly. The development process is also unsuited for many of the other interactive applications discussed above because the development cycle simply takes too long. Similarly, the process of refreshing an existing multimedia application such as a CD ROM catalog is slow and cumbersome. Prior art file structures for multimedia applications tend to be unsuited for integration across the different systems available from different manufacturers of computers and video equipment.

The process of adding interactivity after compositing adds substantially to the development time. Further, the integration of computer programs providing interactive functionality requires a high level of expertise typical of that required of software engineers, making the process beyond the ability of most post-production personnel. Once the interactive functionality is designed, the post-production user has no control over the content or changes to the logic that the post-production person might desire to make in response to changes in program content. Further, the post-production user has limited control over the timing and delivery of a program previously developed. Once an interactive multimedia product has been released for distribution, there is limited or no ability to reuse assets.

The inability of a post production user to control the contents of programming means that home users don't have the ability to eliminate undesirable language in programming.

Objects and Disclosure of the Invention

Accordingly, one object of the invention is to provide methods and apparatus by which a home user of video on demand or multimedia programming has the ability to eliminate undesirable language from such programming.

Another advantage of the invention is the elimination of undesirable language from an audio signal channel utilizing speech recognition.

Another advantage of the invention is the elimination of undesirable language from an audio or text source by detecting words specified by a user to be detected in the text stream and by eliminating particular words from the text stream by preventing an audio or test source from outputting information during the time when undesirable language is present.

Another advantage of the invention is the ability to selectively customize an interactive module to edit programs selected for viewing in the home to eliminate undesirable language.

These and other objects, benefits and advantages are achieved in accordance with the invention by providing apparatus for authoring multimedia assets into a final interactive multimedia application using a computer having a display and a graphical user interface. Storage, associated with the computer, is provided to store multimedia assets and program objects for performing interactive functions. One or more timelines permit a user to place icons representing said multimedia objects and program objects on a timeline using the graphical user interface at a time corresponding to when the object should be viewed during playback, thus integrating multimedia objects together with one or more of said program objects to producing an interactive multimedia application. Playback or execution of the objects represented on the timeline occurs in a time sequence indicated by their position on the timeline.

Preferably, at least one timeline is dedicated to interactive objects. Control of playback or execution of the objects is achieved using edit decision lists (EDL) and interactive decision lists (IDL) which capture the editing decisions made by a user of the tool. The interactive decision list is used to activate retrieval of objects from assets stored, to initiate playback of the objects retrieved and to initiate loading and execution of program objects all in a sequence corresponding to that represented on the timelines.

Objects can be retrieved from storage over a network. Playback or running of the interactive multimedia application can be controlled by executing an IDL at either an end user's location or at a server's location. Since the IDL is a text file, typically represented in ASCII, an interactive multimedia application can be edited using a standard text editor and items can be added, deleted or changed.

A network arrangement can be utilized for the delivery and presentation of multimedia applications represented in an edit decision list or interactive decision list. One or more file servers are connected to the network, which server contains multimedia assets. At the end user location, a set top box, such as a digital entertainment terminal (DET) is connected to the network which uses the edit decision list or interactive decision list to activate retrieval of objects stored on the one or more file servers. Playback of the objects retrieved occurs in a sequence corresponding to that represented on the edit decision list or interactive decision list. Software known as an interpreter may be used to interpret the IDL or EDL one statement at a time to generate the necessary commands to carry out the edit decision reflected in statements on the list. Playback can be controlled from the server location or from the digital entertainment terminal location by retrieving and playing of program objects or by initiating loading and execution of interactive program objects retrieved, all in a sequence corresponding to that represented on the interactive decision list.

In a network arrangement a set top box such as a digital entertainment terminal can be augmented with a personal computer (PC) linked over a data port such as a PCMCIA port of the set top box. Such a PC could run the authoring tool of the invention and utilize the multimedia assets available at one or more file servers on the network to generate multimedia applications in the PC by creating IDLs just as is done in a post production suite.

By adding text editing capability in the set top box, such as by retrieving and executing a program object, IDLs can be created and edited by the end user directly. Text editing, of course, can be performed in an intelligent terminal or DET.

Other types of program objects may be added. For example, where the interactive decision list describes a text source of information which parallels the audio associated with a multimedia application, one program object reads the text source and prevents the audio from being played back when words specified by the user in a stop list appear. In another version, speech recognition is used in lieu of a parallel text channel.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable for modifications in various obvious respects, all without departing from the invention. Accordingly, the drawing and description are to be regarded as illustrative in nature and not as restrictive.

BRIEF DESCRIPTION OF DRAWINGS

FIG. 7 is an interactive decision list (IDL) of the prior art.

BEST MODE FOR CARRYING OUT THE INVENTION

Figure 1:
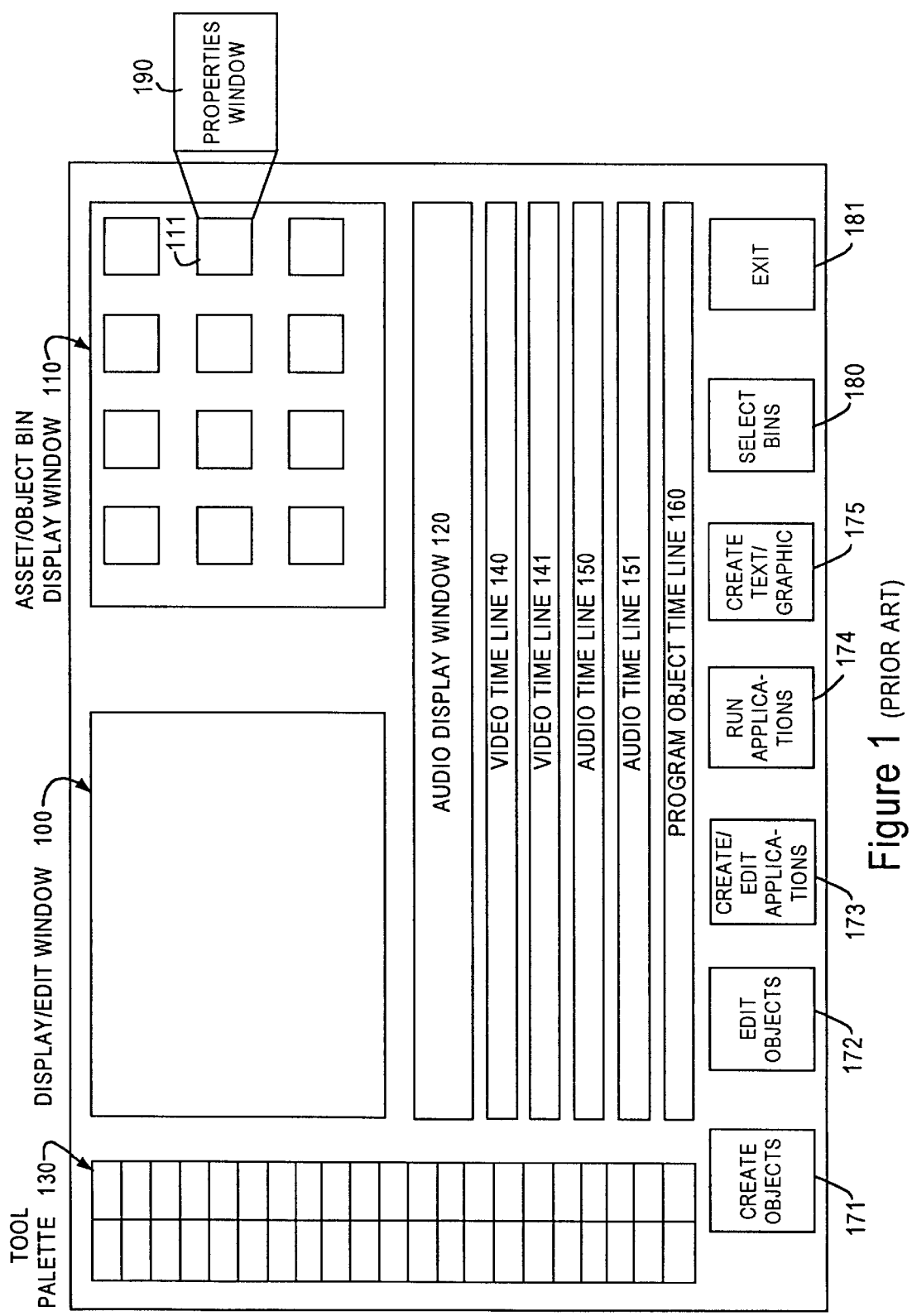
FIG. 1 is an illustration of a typical user interface in accordance with the prior art.

FIG. 1 illustrates a user interface used in the prior art. The graphical user interface is a multiwindow display which can be defined using any number of windowing applications such as MicroSoft Windows or X-Windows running on the computer platform used to implement the invention. Display/Edit Window 100 is a work space where currently selected objects may be displayed and edited. Window 110 displays certain assets or objects which will be manipulated during authoring of interactive multimedia applications. Assets or objects are stored in "bins" or subdirectories each of which reflects objects of a particular type or category. Audio Display Window 120 is a window for displaying audio wave forms to facilitate editing and coordination with the timing of other objects. Along the left side of the display screen are one or more tool pallets 130 such as might be utilized to prepare graphics and text or to invoke special effects. Time lines 140, 141, 150, 151 and 160 are represented as a plurality of tracks. At least two video and two audio time tracks are preferred to facilitate special effects transitions between video or audio programs running on different tracks. At least one interactive object track 160 should be included although two interactive object tracks may prove convenient.

The major functions performed by a developer in creating an interactive multimedia application are shown along the bottom of the display screen. Button 171 invokes an object creation function which permits extraction of an object from one of the available assets and the association of properties with that object. It also permits the creation of placeholder objects. Button 172 invokes the editing of objects to permit changes in their properties such as duration. Button 173 invokes application creation or editing functions which permit objects to be assembled into applications with relative timing specified by their placement along the timeline tracks. Button 174 permits part or all of an application under development to be run and displayed at a location specified, typically in the Display/Edit Window 100, so that the impact of the decisions made in editing of a portion or all of an application may be viewed under run time conditions. Button 175 permits creation of graphics or text overlays which may be separately stored in and used either as individual objects or part of other objects. Button 180 permits particular bins of objects to be selected for editing or placement into the program. Button 181 permits a user to exit the application.

Asset/Object Bin Display Window 110 is used mainly for file management. Raw production assets are preferably kept in a different directory from objects utilized to assemble an application. Separate directories or "bins" are preferably maintained for video objects, audio objects, text/graphical objects, special effects, program objects and applications.

Objects may be created to permit easy manipulation of portions of an asset during creation of a specific application. Other objects are more functional and may be reused in the development of any application. Each object 111 is associated with a number of properties. Typically, these properties are defined at the time of creation of the object and can be specified or edited as required using the functions associated with buttons 171 and 172 of FIG. 1. Preferably, the properties of an object may be selectively displayed in a properties window 190. Although the properties window is shown off the screen for convenience of illustration, in an actual implementation, the properties window would pop up at a specified position on the screen, preferably in Display/Edit Window 100.

It is convenient to have at least one timeline track for each playback medium involved to facilitate combination and deletion of media. For example, in the common situation where one might wish to change the language (e.g., from English to German) in which an integrated multimedia program was implemented, one could strip out the audio track in its entirety. Alternatively, if individual tracks were utilized for the voice of each member of the cast, should test marketing of product show that listeners did not like the voice of a particular cast member, that cast member's audio could be re-done without having to involve the other cast members.

Figure 2:
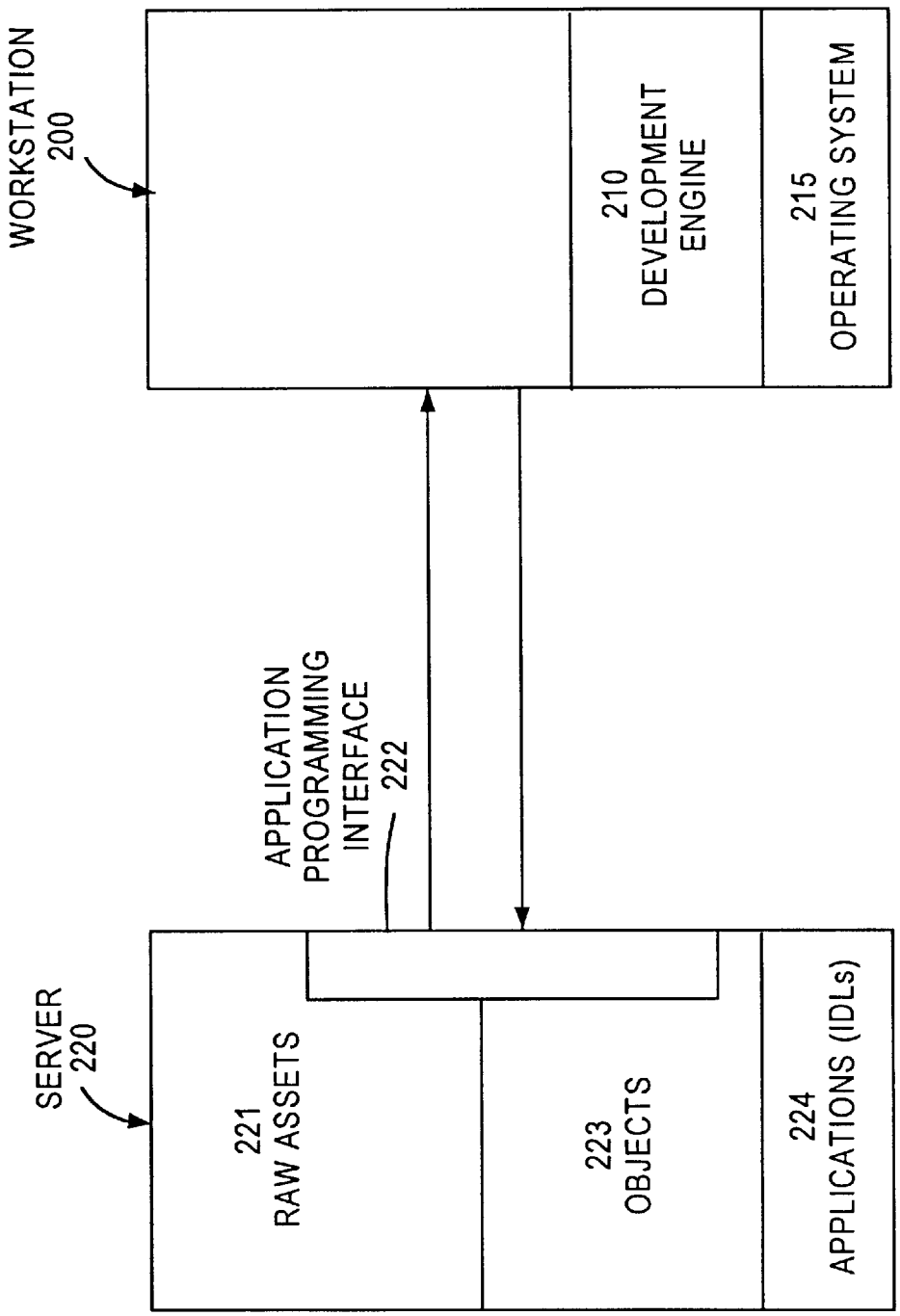
FIG. 2 is a diagram of a development environment utilized to develop interactive multimedia applications in accordance with the prior art.

FIG. 2 illustrates the development environment utilized to create interactive multimedia applications in the prior art. Work station 200 is a computer with a multitasking operating system which runs the authoring tool of the invention and is utilized by production personnel to develop the interactive multimedia application. Server 220 stores raw assets and objects which have been created and which are to be incorporated into the final interactive multimedia product being produced. An application programming interface 222 facilitates the handling of assets and objects by providing a standardized interface to assets, objects and applications on the server so that the contents of the server can be manipulated by all parts of the authoring tool in a consistent manner.

During the production phase, a number of raw assets are created. This might include video assets from a video recorder, a variety of sounds recorded by an audio engineer, the film output from movie cameras with or without related audio tracks, and perhaps different films from different camera locations of the same scene shot by different cameras. It could also include the work of animators, still graphics, special effect computer simulations, text overlays and basically anything that might ultimately end up in the finished product. Note that these assets are raw, that is unedited and that each asset has been converted into a digital form for storage and processing within the server and work station.

Much of the raw material of the assets will not be utilized in the finished product. At some point, someone will review the raw assets and determine which portions of each raw asset should be marked for possible inclusion in the finished product. Individual portions of the raw asset to be considered for inclusion in the final product are identified and individually labeled as objects. The work station 200 permits the screening of assets and the identification and creation of objects from those assets as part of its functionality.

Files are stored in industry standard format to facilitate integration with existing video and computer platforms. Preferably, these files are stored in open media framework format.

Figure 3:
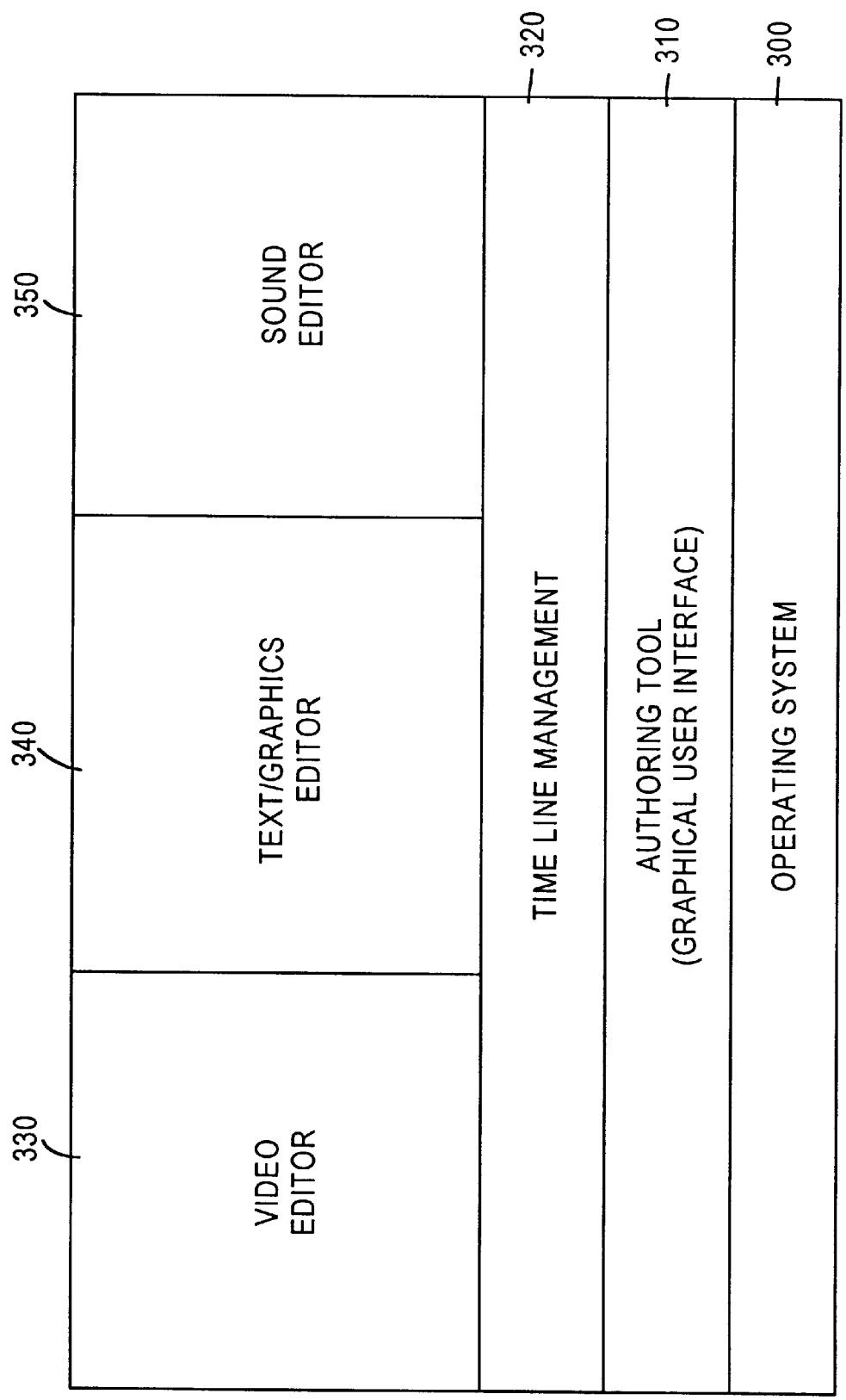
FIG. 3 is an illustration showing the software architecture of the authoring tool of the prior art resident on the work station.

FIG. 3 shows the software architecture of the authoring tools of the prior art as it resides on the work station. Operating system 300 may be any of common operating systems in use including, without limitation, MS DOS, MS Windows, OS2, and any of the variations of Unix. However, an operating system which permits multitasking is preferred. The authoring tool may be implemented using any of the graphical user interfaces currently available including, without limitation, MS Windows or X Windows.

Video editor 330 may be any of several digital video editors available on the market including Radius Video Vision Studio 1.7; SuperMac DigitalFilm Deluxe 1.5; RasterOps MoviePack2, ProSuite 1.5; Data Translation Media 100 1.1 and Avid Media Suite Pro 2.2. The Avid Media Suite Pro 2.2 is preferred. Graphics editor 340 may consist of any commercially available graphics package although Photo Shop or Free-hand is preferred. Audio editor 350 is any one of several commercially available sound editing packages but preferably Sound Edit Pro.

Some assets, such as motion picture films, are captured in such a way that a time code is applied to the material captured. In the United States, a code specified by the Society of Motion Picture and Television Engineers (SMPTE) is standard. Such a code allows each frame of the film to be identified precisely for control and editing purposes. When assets are converted to digital for use with the present invention, if a time code is not available, one is applied to facilitate editing with the invention. This allows an edit point to be defined as a certain duration from a clearly delineated starting point for asset playback. This simplifies object definition because portions of the asset to be used as an object can be specified in terms of starting and ending time or starting time and duration.

A video editor like the Avid Media Suite Pro is a non-linear editor which permits instant access to any segment of video. That is, frames of individual video can be accessed selectively in an arbitrary order and not necessarily sequentially (i.e., non-linearly).

Figure 6:
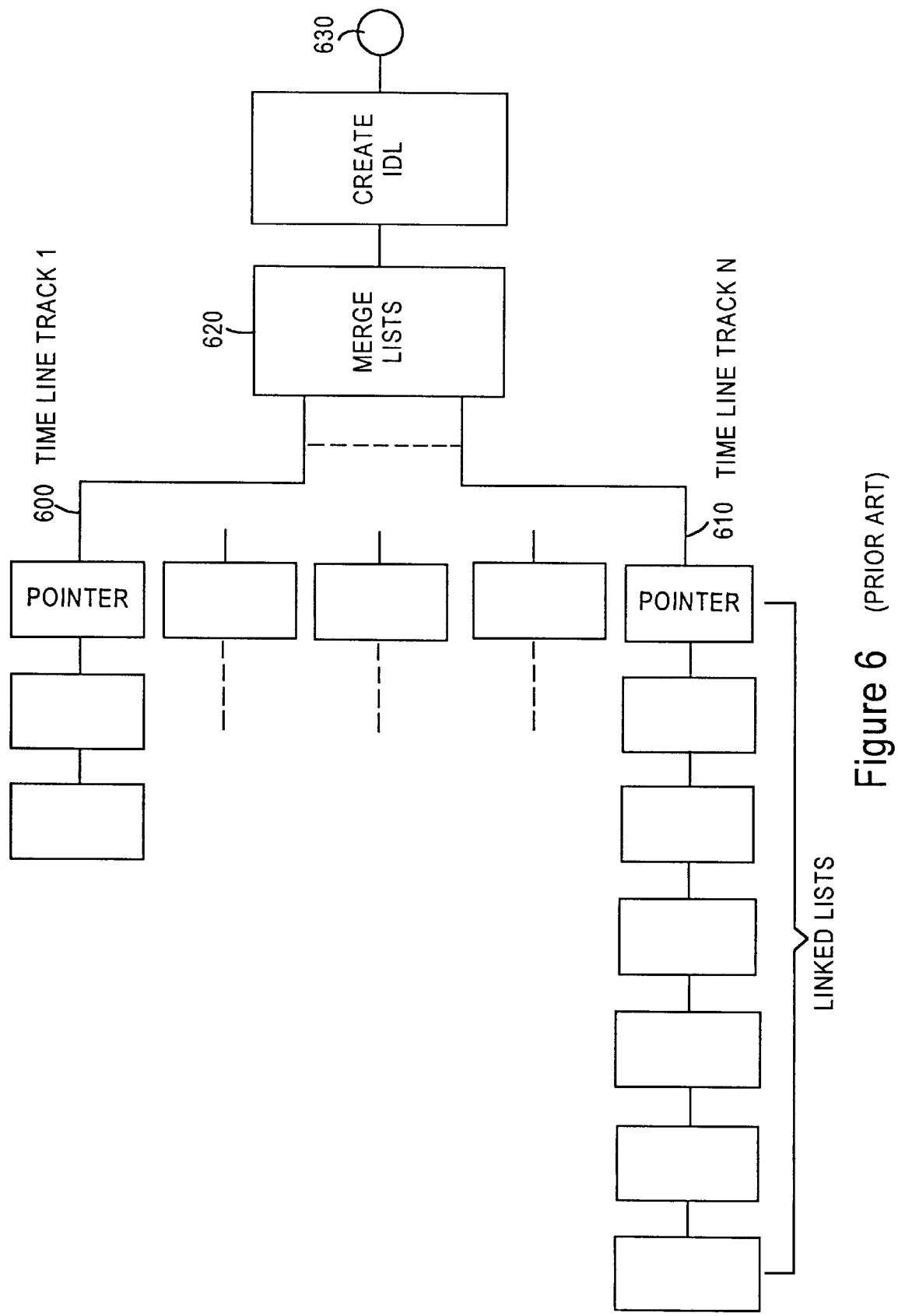
FIG. 6 is a diagram depicting the management of events queued on respective timelines and the merger of those events into an IDL as done in the authoring tool of the prior art.

Timeline management 320 is discussed more in detail in connection with FIG. 6.

One of the principal advantages of this invention arises from the creation and use of reusable computer program objects which can be dragged and dropped onto interactive tracks to enable a non-programmer to achieve functionality which would otherwise require development by software engineers. A sample of some of the kinds of functionality which are desirable for use in creation of interactive multimedia applications include:

1. Addition of hypertext reference to an object;
2. Attaching a yes and no button set to an object;
3. Going to a particular object;
4. Jumping to a particular time code;
5. Spawning other tracks; and
6. Opening another object.

The ability of a non-programmer to invoke program modules by merely placing them at the proper sequence on an interactive track permits a non-programmer to assemble complex functionality which would otherwise require the services of a skilled programmer and an extensive period of software development and testing.

Figure 4:
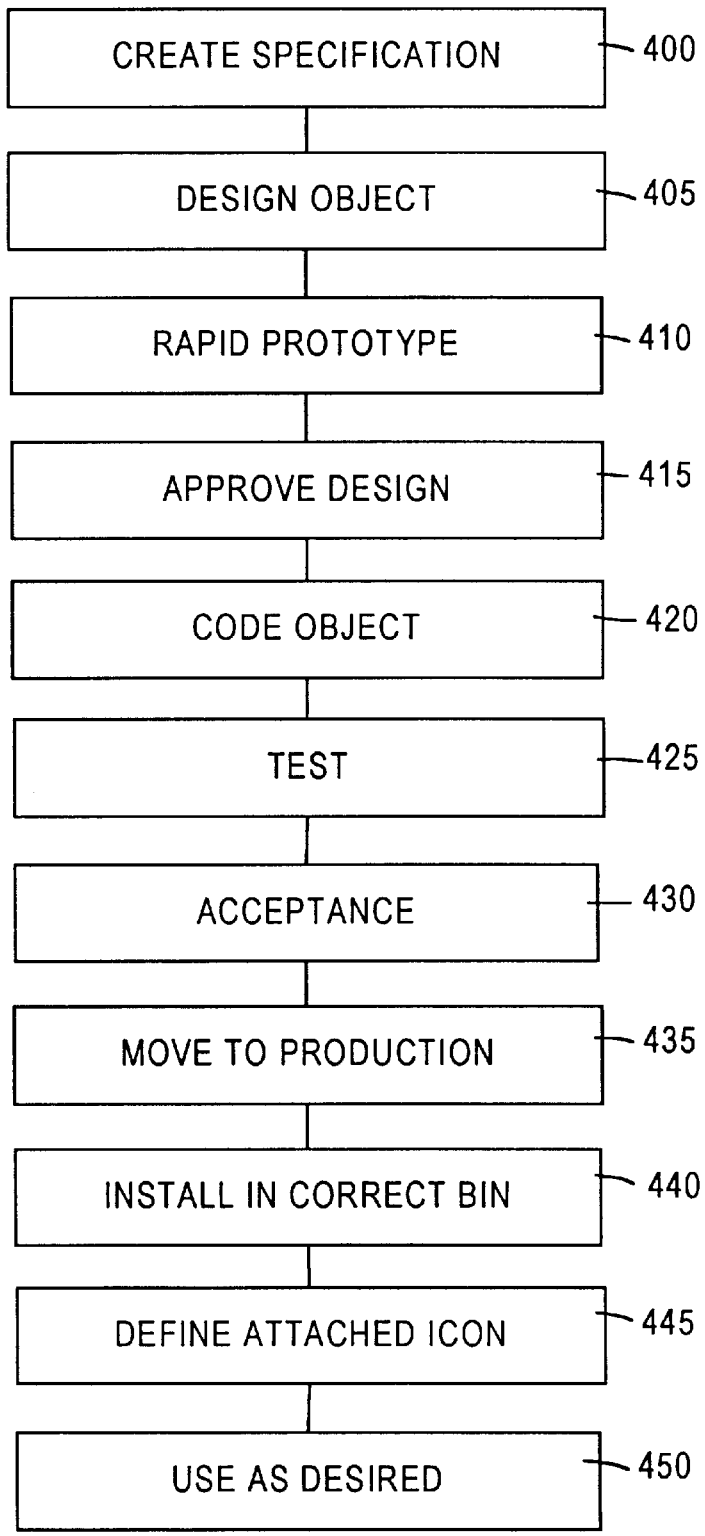
FIG. 4 is a flow chart of the process in the prior art by which reusable interactive objects are developed.

FIG. 4 illustrates the development process by which reusable program objects are developed in the prior art. Although the development of an individual drag and drop program object still requires the services of a skilled programmer or software engineer, once it has been developed it is a tool which can be integrated by a non-programmer into an interactive multimedia application as, where and as often as desired.

To develop a program object, first, a specification (400) for the object is prepared. Then the object is designed and rapidly prototyped (405, 410). Once a design is approved (415) the object is coded (420) by a programmer preferably using the C programming language and using any of several commercially available language development platforms. The module is then tested (425) and reviewed by the developer or customer for acceptance (430). Once the object is moved to production in the authoring tool (435), installed in the correct bin (440) and an appropriate icon attached (445), it is ready for use as desired (450) by the non-programmer.

Figure 5A:
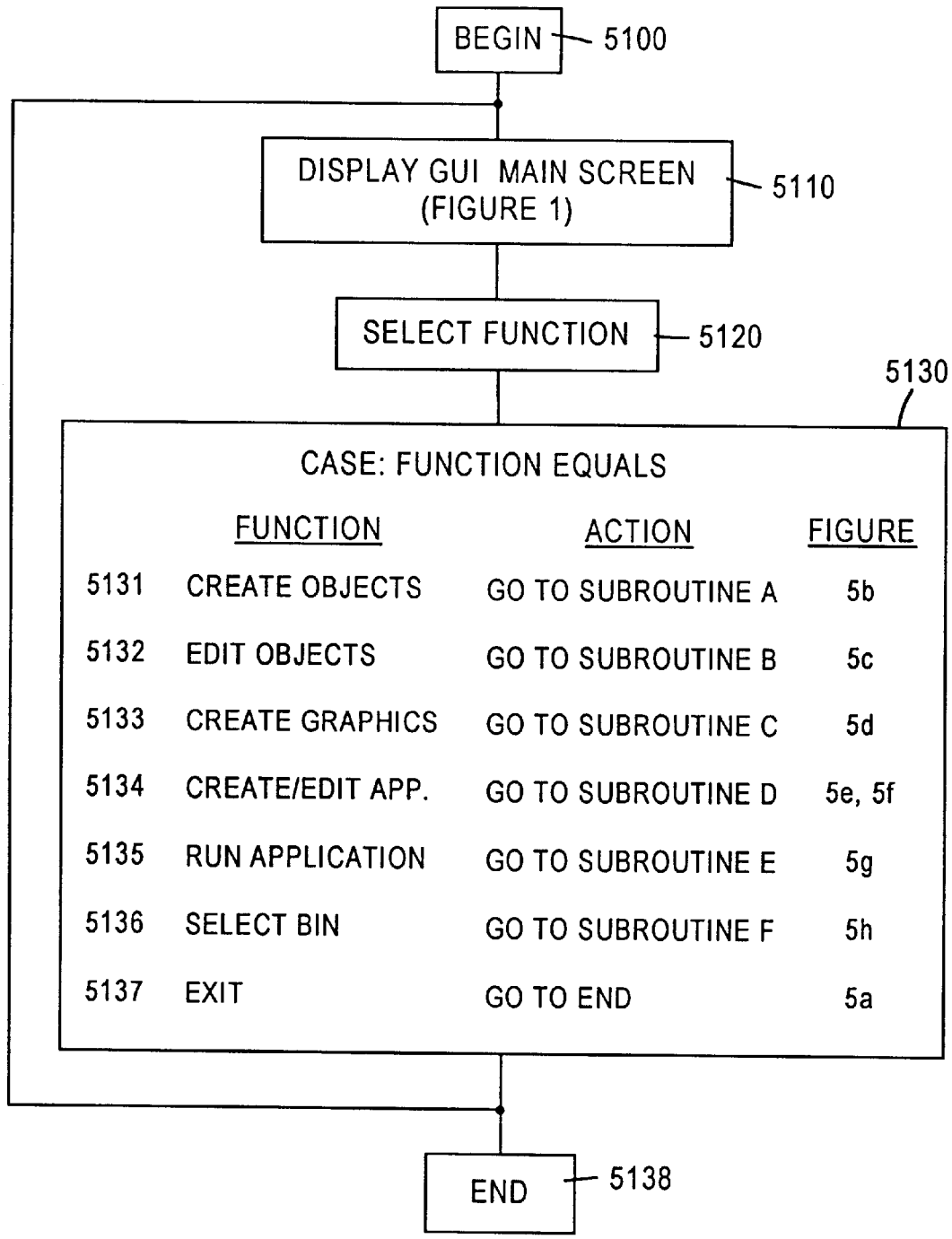
FIGS. 5A–5H comprise a flow chart of the authoring tool of the prior art.

FIG. 5A is a flow chart showing the flow of a main program used with the authoring tool of the prior art. Item 5100 indicates the beginning of the program. Once the program begins, the first important thing that occurs is a display (5110) of the graphical user interface implemented main screen, illustrated in FIG. 1. From the screen, a plurality of functions may be selected (5120) by use of the graphical user interface. Once a function is selected, the selected function is compared against a number of options and the option that matches invokes a subroutine which implements the functionality of the selected option. As is well known in the art, selections in this manner are often implemented using a case statement. This case selection functionality is illustrated at block 5130. If the exit function (5138) is selected, the application will end (5139). If any other option is selected, the appropriate subroutine will be invoked and, upon return from the subroutine, the graphical user interface main screen will again be displayed ready for the user to select a function.

Figure 5B:
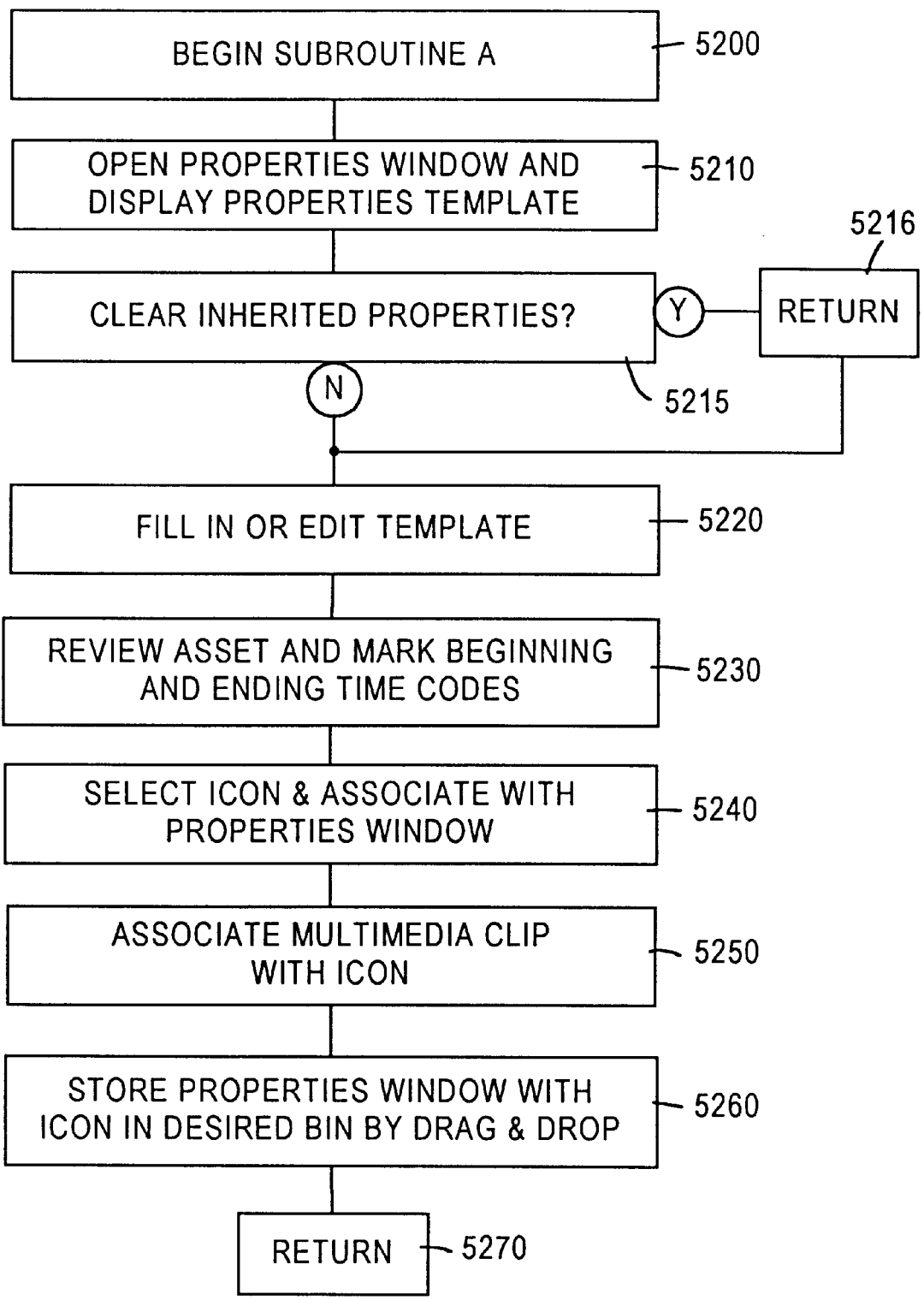

FIG. 5B is a flow chart of the process involved in creating objects in the prior art. This corresponds to subroutine "A" of the case statement 5130 in FIG. 5a. Subroutine "A" is called (5200) when one desires to create an object. A properties window (190 in FIG. 1) is opened and a properties template is displayed (5210). An option is given (5215) to clear inherited properties from the template. If inherited properties are cleared, one fills in the template (5220) or if they are retained the properties may be edited. Once the object is identified by filling in the template, the asset from which the object is to be taken may be viewed in the editor to find the appropriate beginning and ending points to be incorporated into the application. These are marked and the beginning and ending time codes are incorporated into the properties of the object (5230). A bin (e.g., directory) may be selected or the bin appearing in window 110 of FIG. 1 may be accepted as the default bin for storing the object information. An icon is selected (5250) for the object. Optionally, a multimedia mnemonic (such as a preview clip of a movie) is also selected, associated with the icon and activated upon the occurrence of a signal, such as activation of a second mouse button when the cursor is placed on the icon space. Once the object is specified to the user's satisfaction, the icon representing the object may be dragged and dropped (5270) into the appropriate bin. The process ends and returns (5280) to the main routine.

Figure 5C:
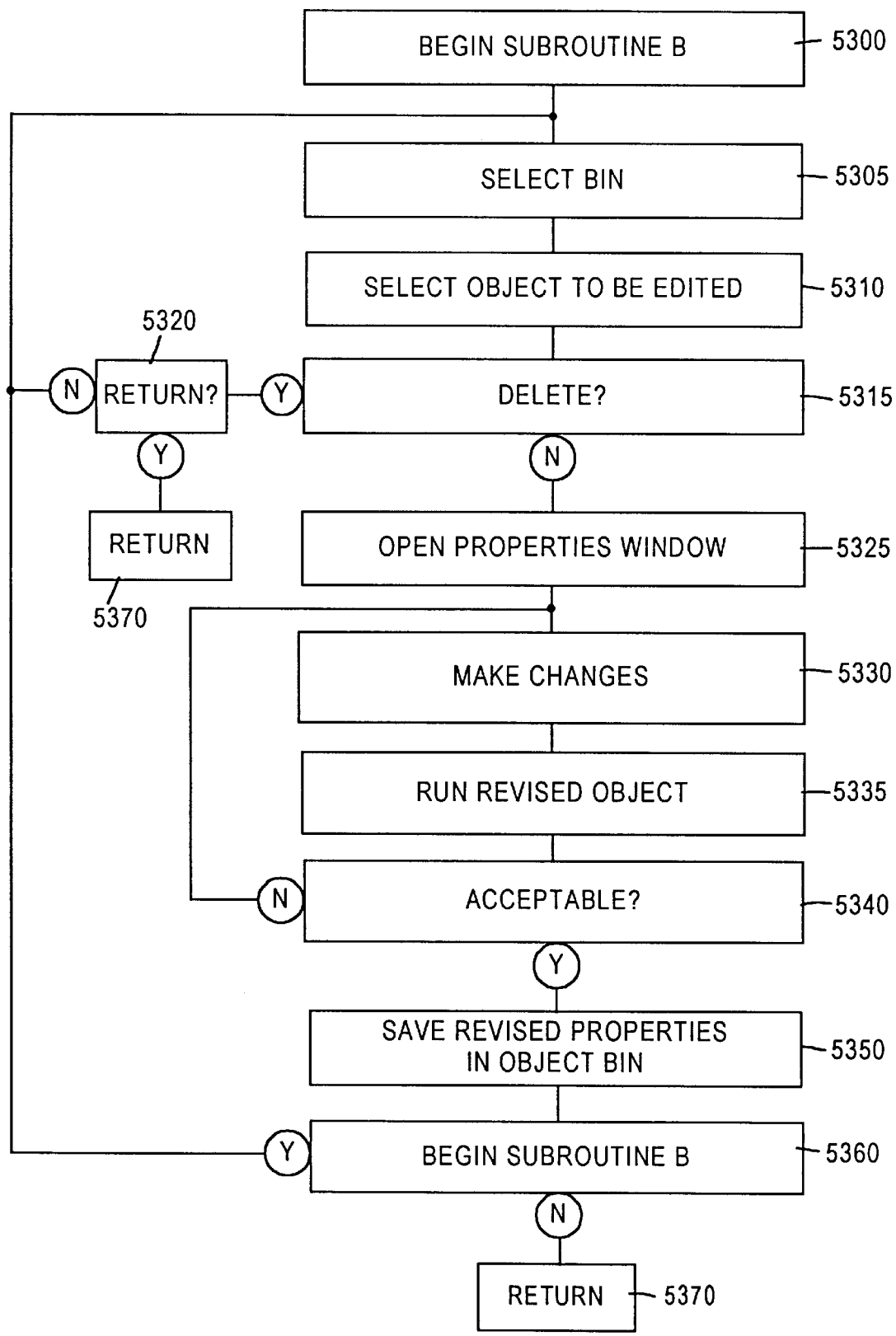

FIG. 5C depicts a process by which objects are edited in the prior art. The process begins with a call to subroutine "B" (5300). After the appropriate bin has been selected (5305) and the object to be edited within the bin selected (5310), a decision is made whether or not to delete the object (5315). If the object is to be deleted, a decision is made whether or not to return to the main routine or to continue with the edit session (5320). If the object is not deleted, the properties window for the selected object is opened (5325), changes are made (5330) and the revised object is run (5335) to determine if the revisions are satisfactory. If the revisions are not satisfactory (5340) the process returns to block 5330 where additional changes are made. If the changes are acceptable, the revised properties for the object are saved in the appropriate object bin (5350). If additional objects require editing, a decision is made (5360) to return to block 5305 to select the next object. Otherwise, the subroutine returns to the main routine (5370).

Figure 5D:
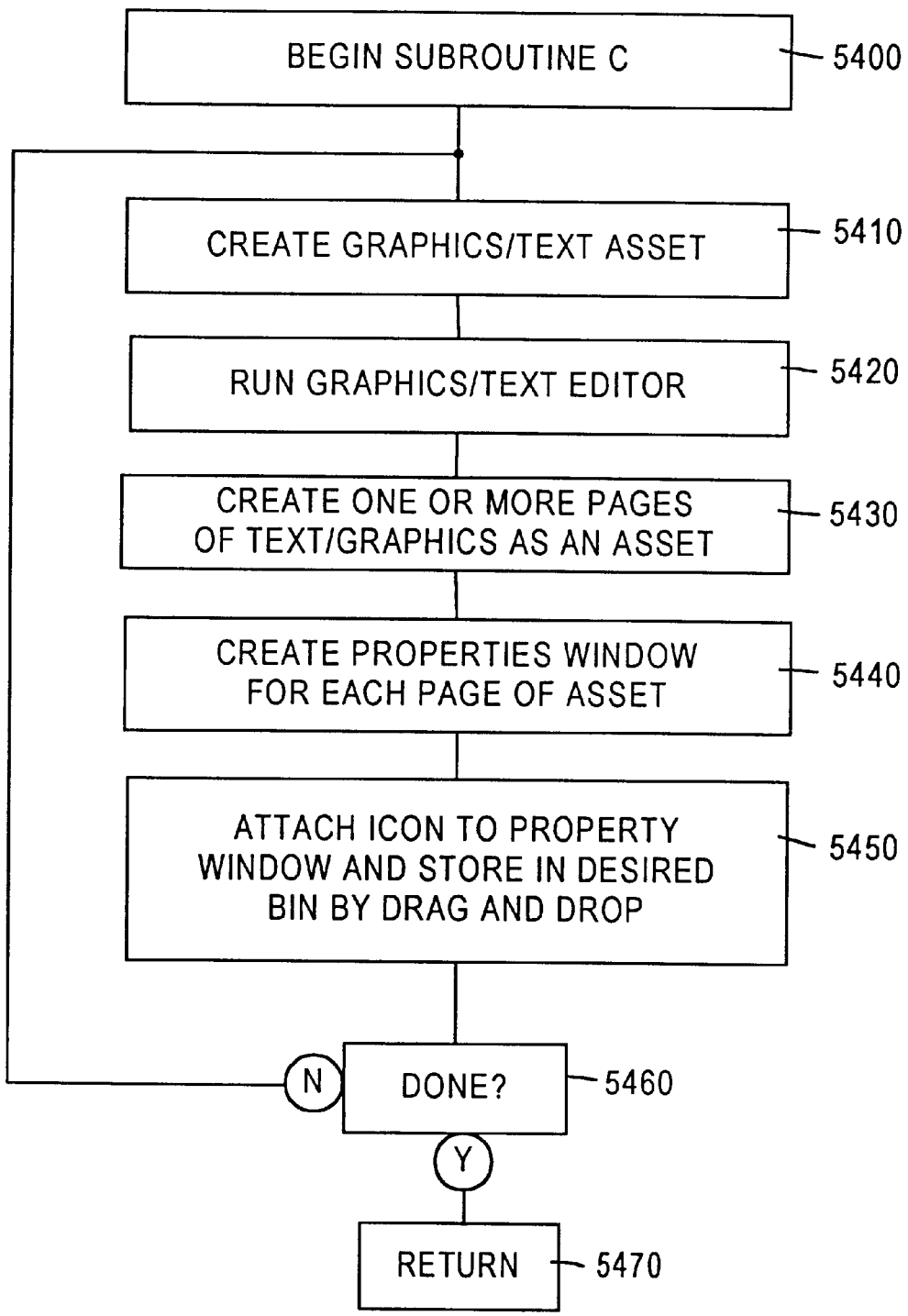

FIG. 5D illustrates the creation of graphics or text overlay objects in the prior art. The subroutine begins with a call to Subroutine C from the main program (5400). Since text overlays are typically a series of credits, a graphic/text asset (5410) is created by creating an appropriate subdirectory. The graphic/text editor 340 is invoked (5420) and one or more pages of text or graphics are created and stored as an asset (5430). An object is created by creating a properties window for each page of the asset (5440) and the properties window is stored in the appropriate object bin (5450). If more assets or objects are required, a decision is made to continue (5460) and program control branches back to block (5410). Otherwise, a decision is made to return to the main program at (5470).

Figure 5E:
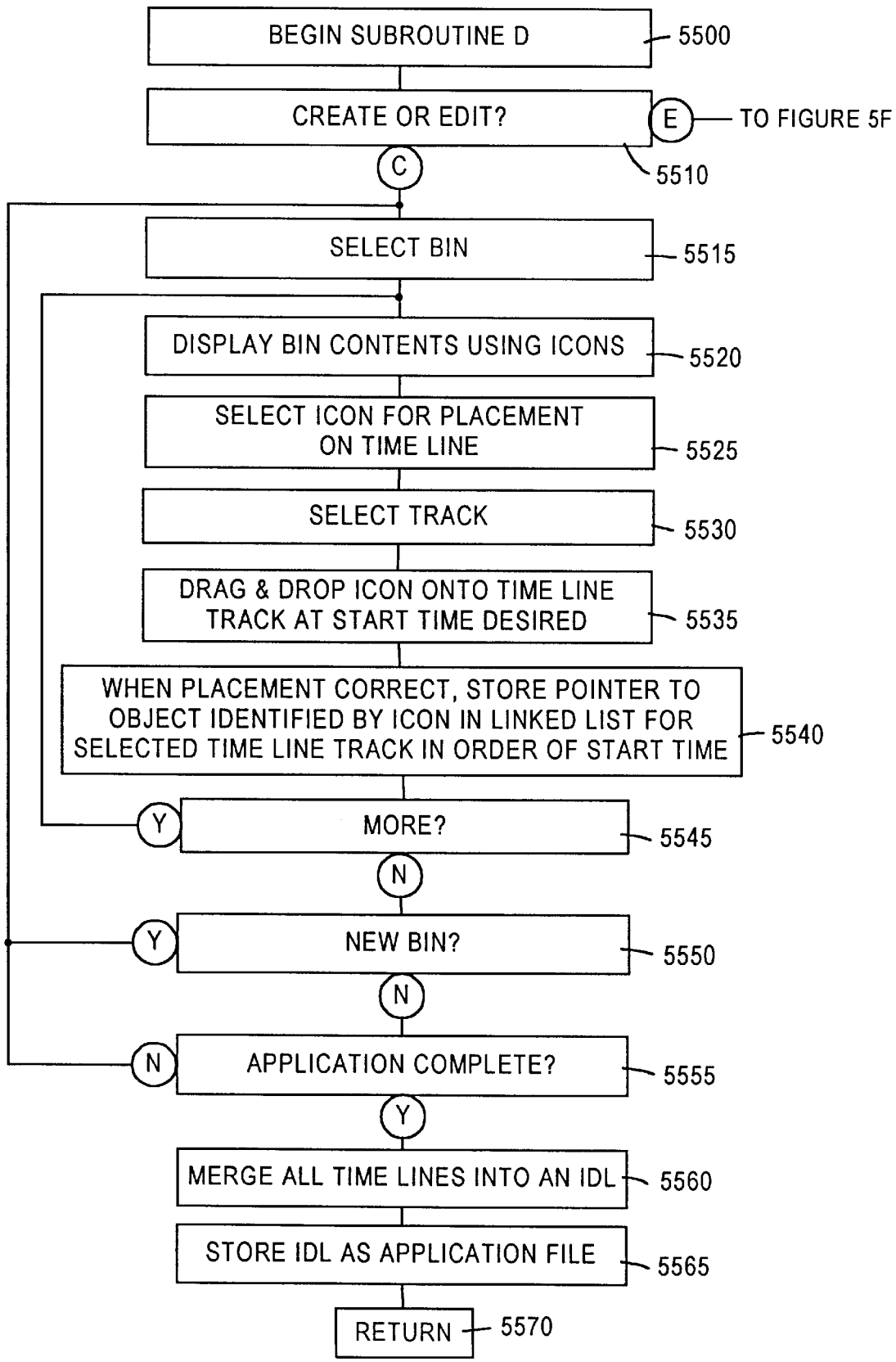

FIG. 5E illustrates the process by which interactive multimedia applications are authored in the prior art. Subroutine D begins with a call from the main program at 5500. A decision is made (5510 whether to create or edit an object. If the decision is to edit, control branches to block 5610 of FIG. 5F. If the decision is to create an object, the appropriate bin is selected (5515) and the contents of the bin are displayed (5520) in the Asset/Object Bin Display Window (110 of FIG. 1) using icons (111 of FIG. 1). The user selects one icon for placement on the timeline (5525). The user also selects the timeline track on which the icon is to be placed (5530). The user then drags and drops a copy of the icon onto the selected timeline track at the start time desired and makes any adjustment in starting time necessary (5535). Once placement is correct, a pointer to the object identified by the icon is stored in a linked list for the selected timeline track at a location determined by its start time (5540). If more icons are desired to be placed from this bin (5545) control returns to block 5515. Otherwise, control passes to 5550 where a decision is made whether or not a new bin should be selected. If a new bin is selected, control returns to block 5515 and the process begins again. If no new bin is required a decision is made whether the application has been completed at 5555. If it has not been completed, control passes to block 5515. However, if it has been completed, all timeline tracks are merged into a single IDL as shown at 5550.

The linked list contains merely pointers, but the IDL or EDL contains a full description of each edit decision. The pointers of the linked list point to the memory locations where full descriptions are stored. The process of merging the time line tracks into an IDL requires that the memory be accessed to obtain the records pointed to by the pointers of the linked list in run time order as set forth hereinafter in connection with FIG. 6. The IDL is stored as an application at 5565 and the process returns to the main routine at 5570.

Figure 5F:
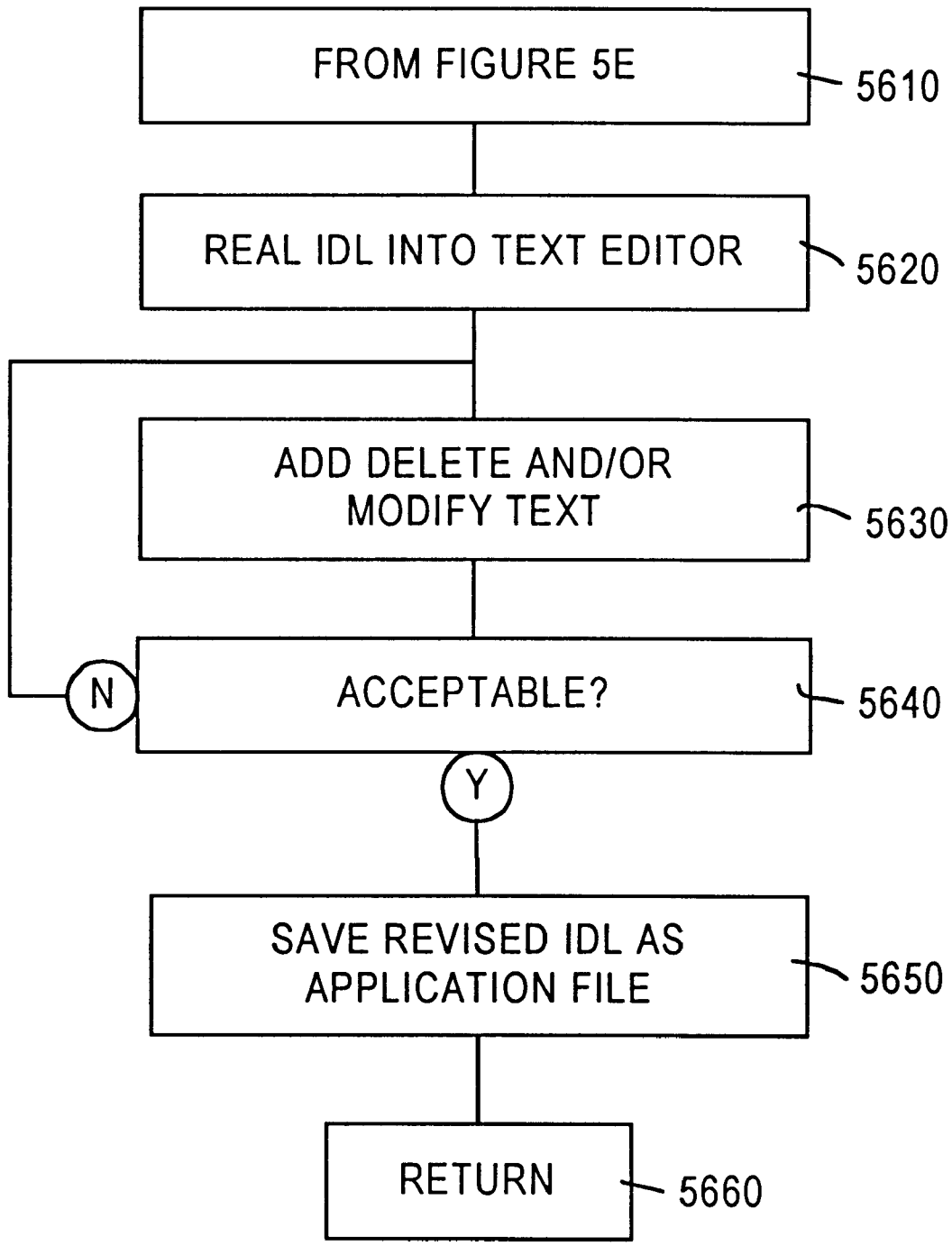

The IDL is essentially an ASCII text file and can be read and edited as such. Accordingly, when it is desired to edit interactive multimedia applications represented as IDLs, simple text editing of the text file as illustrated in FIG. 5F is all that is required. This involves reading the IDL into a text editor (5620) adding, deleting or modifying (5630) the text, iterating (5640) as necessary and storing the revised IDL (5650). The simplicity of the editing process also permits very easy refreshment of interactive multimedia applications. The time required for the refresh cycle is thus compressed dramatically so that new additions can be produced on a daily basis, if desired.

Figure 5G:
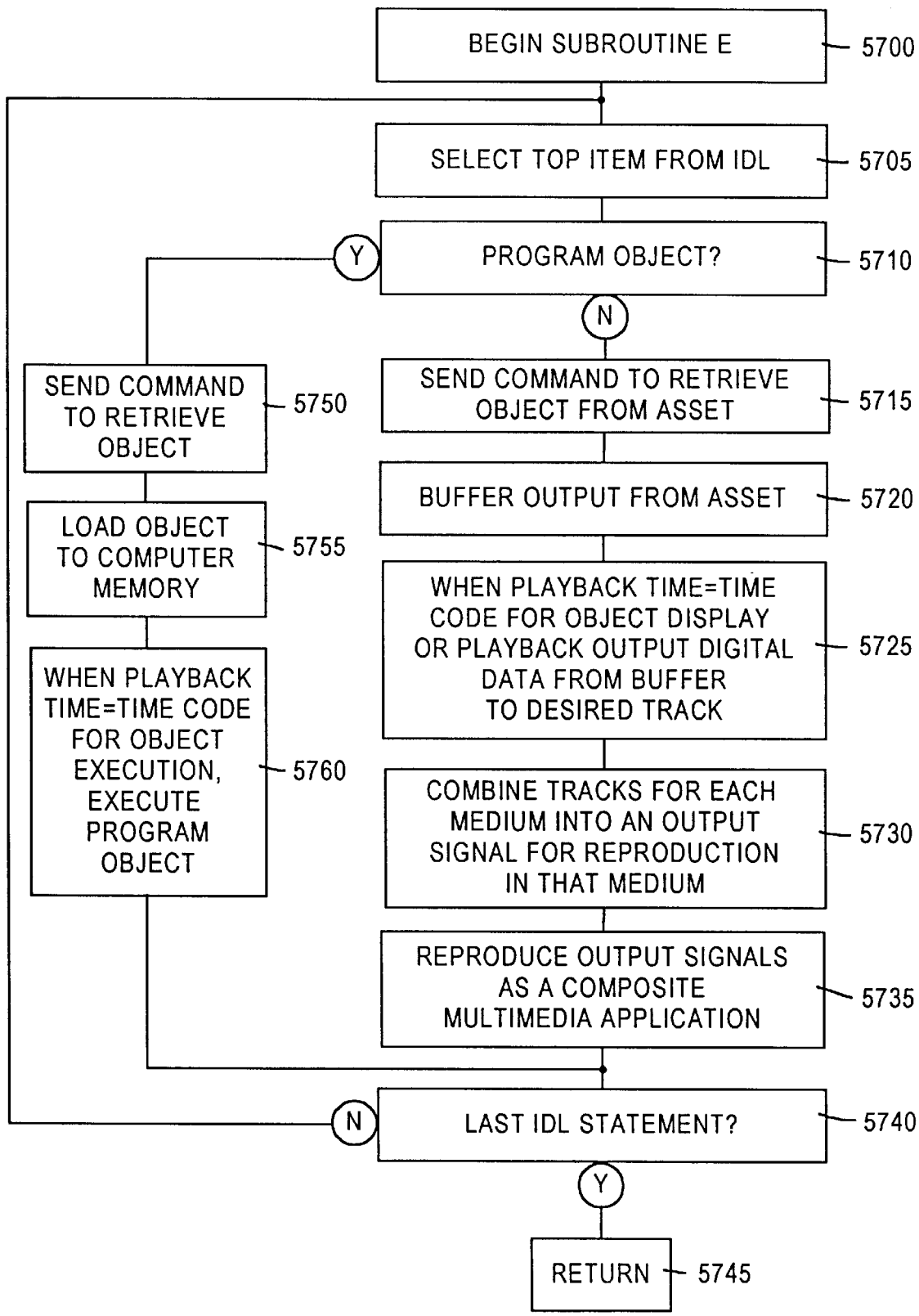
Figure 5H:
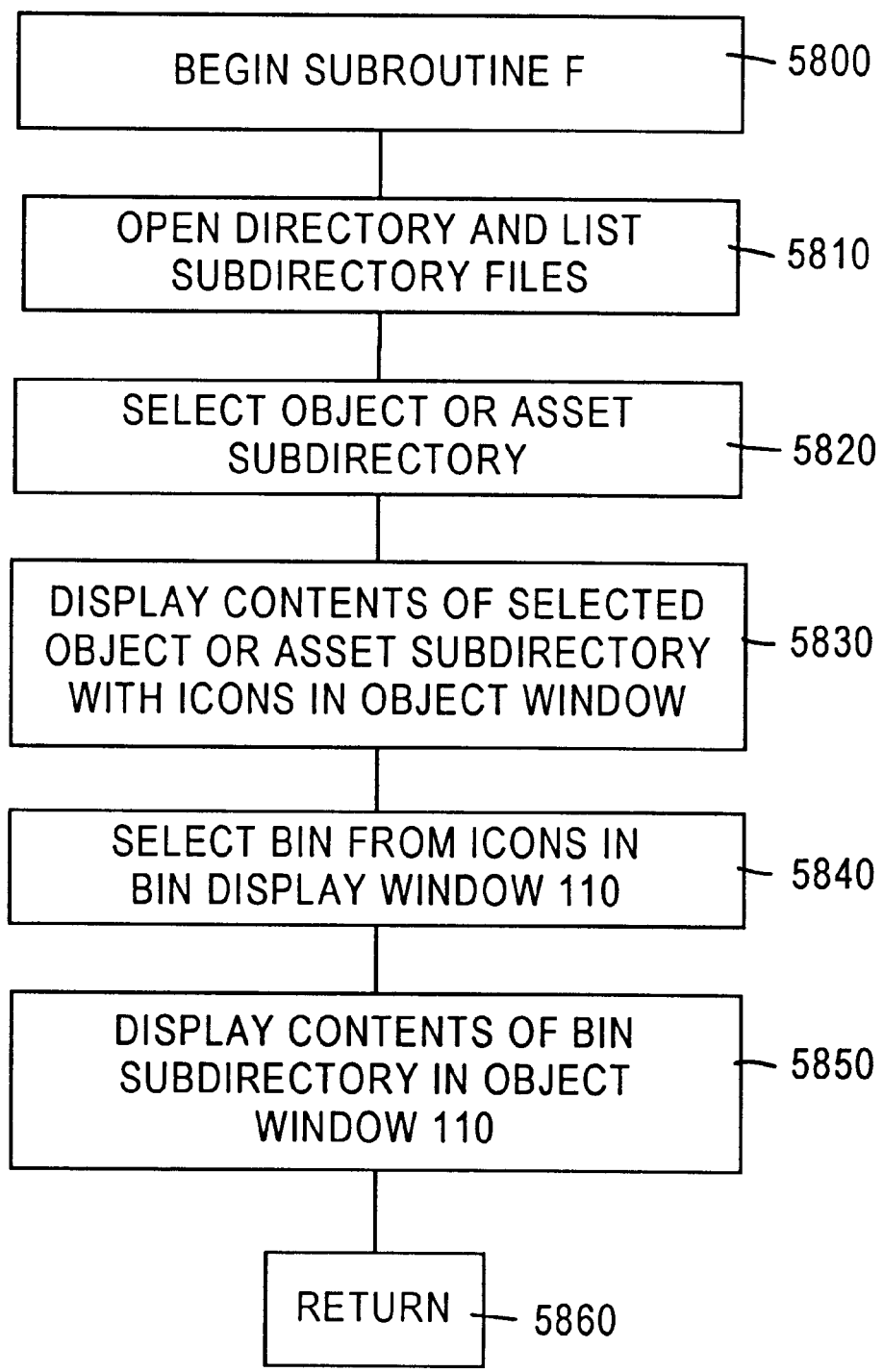

FIG. 5G is a flow chart of the prior art run time process by which an IDL is played to create the final output to be experienced and interacted with by the end user. The process begins with a call to Subroutine E. The commands on the IDL are executed sequentially. The top item from the IDL is selected (5705) and a send command is issued (5715) to the server to retrieve the object from the asset. Typically, the command is sent early to allow for any server or network latency. If a normal play or display object is retrieved, optionally, the output from the server may be buffered (5720). When the time comes for an object to be played or displayed, (i.e. playback time equals time code for object display or playback) (5725) the digital data from the object is output to a desired output track. Depending on hardware configuration, it may be desirable to combine the tracks (5730) for each medium into an output signal for reproduction on that medium. The signals for the individual media then are reproduced and presented to the user (5735) or alternatively captured on a recording medium, such as a VCR or other interface for later playback.

If, however, the object retrieved is a program object (5750), that object will be loaded to the computer program memory directly (5755). When playback time equals the time for object execution, the program is executed (5760). At this point, it may be desirable to have a number of interactive tracks so that a number of sets of computer program modules can be running simultaneously on the multitasking processor. The overall process is repeated (5740) until each statement of the IDL has been executed, at which time the process returns (5745).

Subroutine "G" begins with a call from the main program (5800). A high level directory is opened and a list of subdirectories and files is displayed (5810). A selection is made between asset and object subdirectories (5820). The contents of the selected subdirectory is displayed (i.e. a list of bins) (5830). A particular bin from the subdirectory displayed in the window is selected (5840) and the contents of the bin subdirectory (i.e. objects) are displayed in the Assets/Objects Bin Display Window (5850). At this point, the process returns to the main routine (5860).

FIG. 6 is an illustration of timeline management of the prior art. Associated with each individual timeline track is a data structure, preferably a linked list, each entry in the list points to another data structure which contains the information necessary to execute the object on the timeline. Sample data structures are discussed more hereinafter with reference to FIG. 9. As each object is placed on a timeline track, an entry is made in the linked list for that timeline track by inserting a pointer at a point corresponding to the time of execution. Typically, a new event can be placed at any point in a linked list by changing the pointer from the previous entry to point to the new entry and by having the new entry point to the entry which prior to the addition was next. Thus, although events may not be added in strict sequence, and although data structures for events may be stored randomly throughout the memory space, management of the pointers permits the event to be placed in sequence when playback is desired.

Each list manages a track 600, 610 and an IDL is created by merging (620) the output of the various lists. The merge function 620 involves examining the data structures pointed to by the top item on each list and comparing the times of execution and selecting for output the top list entry from a particular track which has the earliest execution time. Thus, all event entries from each track are sorted by time of execution into a single ordered list of pointers. The data structures are retrieved in the order specified by the merged list and stored as an IDL list. Preferably, an identification of the track from which the pointer of a particular IDL entry originated should be maintained to facilitate editing operations.

FIG. 7 shows an interactive decision list of the prior art of the type created as shown in FIG. 6. Five columns are listed in this example. Column 1 represents execution/playback time. Column 2 lists an action/object pair which specifies the particular action to be taken and the object of the action. Columns 3 and 4 specify the beginning and ending time of the portion of the object used to define the object. Column 5 specifies the track of origination. For example, the first entry 700 consists of a playback time, the action "run" and the object "video asset 275" in the range of time codes from "Begin" to "End." The track of origin specifies that the event originated from the track associated with video channel 1. Entry 710 is similar except the video asset originated on channel 2. Entry 720 invokes special effects to fade the output signal away from channel 1 and to channel 2. Entries 730 and 740 invoke display of a text overlays on channel 1. Entry 760 involves running video asset 132 through the end of the application. Statement 770 invokes the loading and running of interactive object 172 which, in this case, creates a "yes"/"no" button set with text specified by a control parameter, detects the response and forwards it to a server based process for tallying. The application ends at statement 780.

Figure 8:
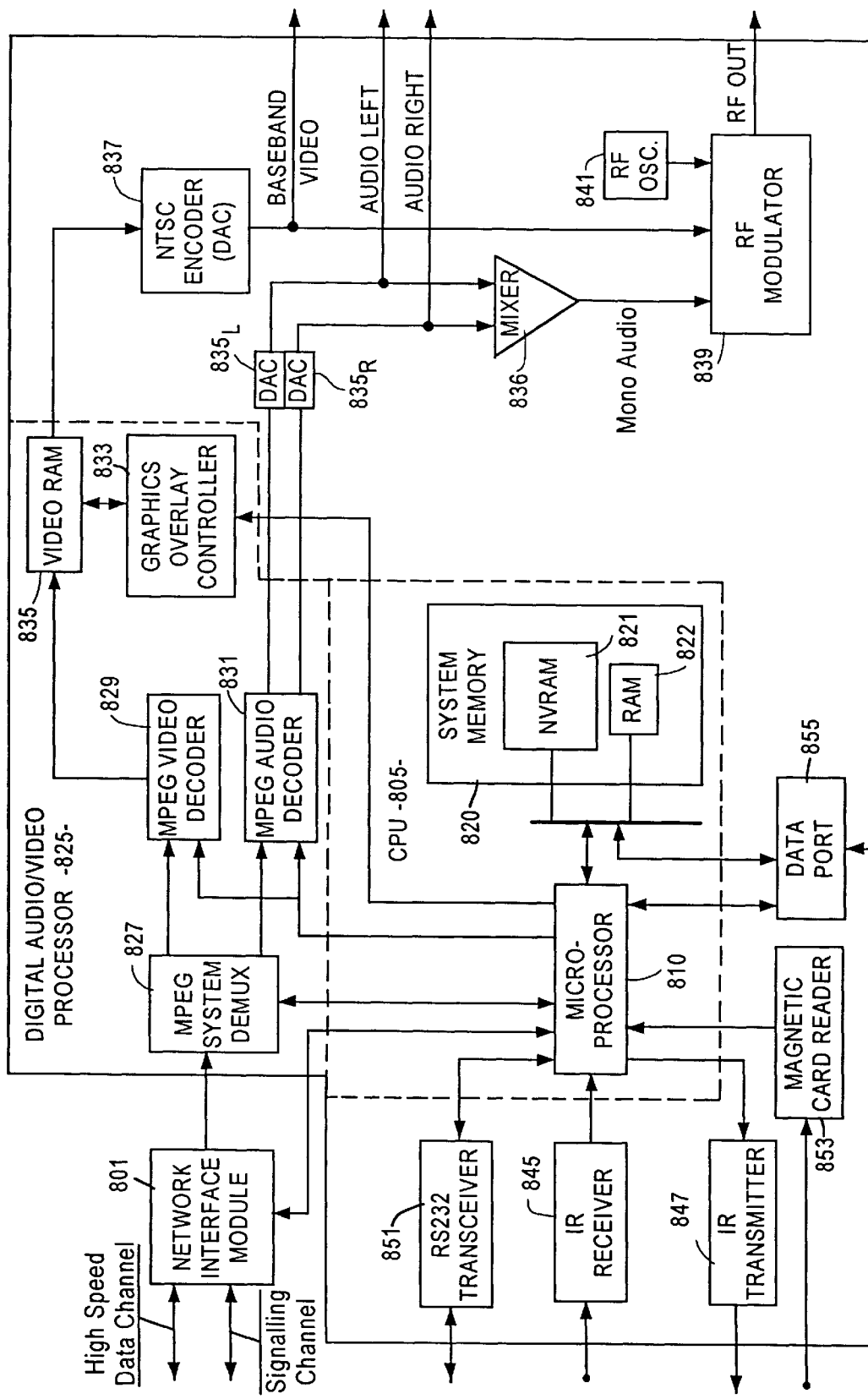
FIG. 8 is a block diagram representation of a set top box or digital entertainment terminal of the prior art utilized in carrying out certain aspects of the invention.

FIG. 8 depicts a prior art intelligent terminal or set top box or digital entertainment terminal (DET) for which the authoring tools of the invention are particularly well suited. The DET 800 shown in the FIG. 8 will connect to a number of different types of networks, such as the Video Dial Tone network shown in FIG. 9, and more advanced video distribution networks disclosed in commonly assigned application Ser. No. 08/250,792, filed May 27, 1994, entitled "Full Service Network", the disclosure of which is incorporated herein entirely by reference. The Video Dial Tone network of FIG. 9 will be discussed in more detail below as a representative example.

For each different type of network, the DET 800 will include a network interface module 801 providing the actual physical connection to the particular type of network. The network interface module 801 will also perform any format conversion necessary between signal formats utilized by the network and signal formats used within the DET 800. For example, in the Full Service Network disclosed in the cited 08/250,792 application, the network interface module 801 will include means to demodulate received broadband data and convert ATM (Asynchronous Transport Mode) cell stream data into MPEG bit stream data for further processing. The network interface module also provides two-way signal conversion and formatting for at least a control signalling channel.

In the illustrated embodiment, the network interface module 801 presents two connections to the rest of the DET, a high bit rate broadband connection and a low bit rate signaling connection. The broadband connection is a one-way downstream only connection, but the low-bit rate signaling connection is a two-way connection. In the Video Dial Tone Network of FIG. 9, the network interface module would provide corresponding connections to an in home ADSL multiplexer unit. Alternatively, the ADSL unit could be included as one or more additional chips within the DET. In other networks, for example using coaxial cable or optical fiber, the network interface module would include means to multiplex and demultiplex signals for transmission/ reception over the coaxial cable or optical fiber. The network interface module would also include the means to physically connect to the particular network. For example, in a fiber to the home network, the module would include a means for two-way conversion between electrical and optical signals and connections to one or more optical fibers for the necessary two-way transmission.

The DET 800 includes a CPU 805, comprising a 386 or 486 microprocessor 810 and associated system memory 820. The system memory 820 includes volatile dynamic RAM 822 and non-volatile RAM 821. The microprocessor 810 includes a small amount of ROM. An EPROM memory (not shown) also may be added.

A digital audio/video signal processor 825, controlled by the CPU 805, produces digital uncompressed audio and video signals from the audio and video MPEG encoded packets received from the network through the interface module 101. The audio/video processor 825 includes an MPEG system demultiplexer 827, an MPEG video decoder 829, an MPEG audio decoder 831, a graphics overlay controller 833 and at least two frames (e.g. 8 mbytes) of video RAM 835.

The MPEG system demultiplexer circuitry 827 recognizes packets in the MPEG data stream received over the broadband channel through the network interface module 801 and routes the packets to the appropriate components of the DET. For example, the MPEG system demultiplexer 827 circuitry recognizes audio and video packets in the MPEG data stream and routes those packets to the decoders 829, 831, respectively.

The MPEG video decoder 829 decompresses received video packet signals to produce a digital video signal, and the MPEG audio decoder 831 decompresses received audio packets to produce left and right digitized stereo signals. For at least some functions, the MPEG decoders 829, 831 may be controlled in response to signals from the microprocessor 810. The MPEG video decoder 829 will internally include at least two frames (e.g. 8 mbytes) of RAM (not separately shown) for use as a frame reorder buffer during the MPEG video decoding process, and the MPEG audio decoder 831 also may include some buffer memory.

The video RAM 835 is not a specialized "video RAM" as that term is sometimes used in the television art. The RAM 835 is actually a standard digital data RAM, of appropriate size, which is used in the DET to store digitized frames of video data. The RAM within the MPEG video decoder 829 likewise consists of standard digital data RAM.

The graphics display generator produces displays of text and graphics data, such as the initial turn-on selection menu received over the signaling channel, in response to instructions from the CPU 805. The video RAM 835 sequentially receives each frame of digitized, uncompressed video information, as output from the MPEG video decoder 829. The video RAM 835 also receives digital information and read/write control signals from the graphics overlay controller 833 representing the several planes of text and graphics information and combines that information with the frames of decompressed video to produce composite video frames.

The graphics overlay controller 833 and the video RAM 835 actually cooperate to manipulate different planes of video information which can be active at any one time, to produce the composite video fame output signals. The individual planes comprise as a minimum the decoded MPEG video frames, a cursor, two graphics/text image planes manipulated by the microprocessor 810 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 829. When no received video frames are to be output, either when none are received or when they are to be entirely replaced, the information from the graphics overlay generator 833 would specify a background and the active planes of text or graphic information. When received video frames are combined with text and/or graphics, the composite video frames include the uncompressed received video frames with selected pixels thereof replaced with graphics or textual data display pixels specified by the graphics overly controller 833. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 800 includes audio digital to analog converters (DAC's) 835$_L$, 835$_R$, an audio mixer 836, an NTSC encoder 837, and an RF modulator 839.

The DAC's 835$_L$ and 835$_R$ receive the uncompressed left and right digitized audio signals output by the MPEG audio decoder 831. In response, the DAC's 835$_L$ and 835$_R$ produce baseband analog audio signals for output to individual baseband output terminals. The audio mixer 836 also receives the baseband audio signals from the DAC's 835$_L$ and 835$_R$. The mixer 136 combines the left and right analog audio signals to produce a monaural audio signal as the audio input to modulator 839.

The NTSC encoder 837 also performs a digital to analog converter (DAC) function. In response to the digitized video output signals from the video RAM 835, the NTSC encoder 837 produces a baseband analog video signal in standard NTSC format. The baseband NTSC video signal is supplied to an output terminal of the DET 800. The baseband NTSC video signal is also supplied to the RF modulator 839. The RF modulator 839 responds to the mono audio signal, the NTSC video signal and an RF signal from a local RF oscillator 841, to produce a standard RF television signal on an available TV channel, typically channel 3 or channel 4.

The type of connection of the DET 800 to the television set depends on the capabilities of the user's television set. If the user has a monitor type television capable of receiving baseband video and stereo audio inputs, the appropriate terminals of the television would connect directly to the video and audio output terminals of the DET 800. If the subscriber does not have such a television monitor, then the RF output of the modulator 839 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user and transmit appropriate data signals over a narrowband channel through the particular video network. For example, in the Video Dial Tone network of FIG. 9 discussed in more detail below, the DET 800 would send and receive control data through a 16 kbit/s channel on the subscriber's loop, and the network includes an X.25 type packet network for transport of the control signaling data.

In the prior art embodiment illustrated in FIG. 8, the DET 800 includes an infrared (IR) receiver 845. The (IR) receiver 845 responds to inputs signals from a user operated IR remote control device (not shown) similar to that used today for controlling televisions and video cassette recorders. In response to the IR signals, the receiver 845 produces corresponding digital data output signals. The microprocessor 810 interprets the digital data signals by the IR receiver 845 as input commands. The precise interpretation of specific command signals can vary based on the downloaded applications programming and/or operating system software stored in the system memory 820. In response to the input commands, the microprocessor 810 controls cursor position and alphanumeric information displayed as graphics and text on the associated television set. The microprocessor 810 will also respond to an appropriate input command from the user to formulate a message for upstream transmission though the network interface module 801 and the signaling channel of the particular connected network. This capability is used to send requests to the server for objects next scheduled for delivery to the end user.

The DET of the present invention is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software, and at least one VIP (the VIP selling the DET) can download all or a part of the operating system. In non-volatile memory (ROM and non-volatile RAM), the DET will store a loader program and an operating system. The loader program and operating system in the ROM and the non-volatile RAM will include sufficient programming to control initial communications and define interfaces and drivers, e.g. for graphics to define the base line functionality of the DET for all service applications the DET will run. If connected to a network of the type illustrated in FIG. 9, for example, the loader program would enable initial communication with a level 1 gateway through the particular type of connected network.

The asset and object server of this invention can be used as a VIP when development of an interactive multimedia application occurs over the network. The loader routine also provides sufficient programming to access a level 1 gateway, L1GW in FIG. 2, and subsequently access a level 2 gateway (L2).

The DET 800 of the present invention may also include a number of additional interface devices. In the example illustrated in FIG. 1, the DET 800 includes an IR transmitter 847. The transmitter 847 responds to digital data signals from the microprocessor 810 and outputs corresponding IR signals for wireless transmission. The IR transmitter 847 and IR receiver 845 may operate together to provide a two-way wireless data communication link to some remote device, such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver 851 connected to the microprocessor 810. An RS-232 port is a standardized two-way serial data interface typically used for connecting computers to peripheral devices, such as modems. In the present system, the RS-232 transceiver 851 might provide a serial data connection to an external personal computer (PC), such that the DET permits communications between the PC and the Video Dial Tone network. Alternatively, this port might connect the DET to a printer, e.g. to print coupons during home shopping/browsing services. A hand-held diagnostic terminal would also connect to this port during servicing of the DET. The communications and protocols offered by the DET through the transceiver 851 would be controlled by the operating system and applications program software downloaded into the system memory 820.

The illustrated DET 800 further includes a data port such as a personal computer memory-card interface adapter (PCMCIA) port 855. Such a data port is a two-way interface for connection to and communication with external devices such as a flash memory module of the type now incorporated into advanced "smart card" devices. In a medical service, a user might communicate with a medical information database through the DET 800 and the broadband network. The user's personal medical history information could be read from the smart card and subsequently updated on the smart card, through the PCMCIA port 855. Another use of this port might involve communication to a connected video game system to download video game software to the video game system and/or play interactive video games. Although specified as a "memory" port and mapped by the CPU as part of its system memory space, the devices connected to this port 855 can have other data processing capabilities, e.g. buffering and modem communication capability.

In the current implementation, the PCMCIA port 855 will carry 6 Mbits/s of data, but the port can be designed for higher speeds such as 20 Mbytes/s. Another use of this port would be for connection to an Ethernet card or other Local Area Network (LAN) card to permit data communications between the DET and one or more computers. The DET would provide the computers with communications services through the broadband network, for example to receive high speed downloads of new or updated software for those computers. Although similar functions are possible through the RS-232 transceiver 851, the data rate through the PCMCIA port 855 is much higher.

Figure 9:
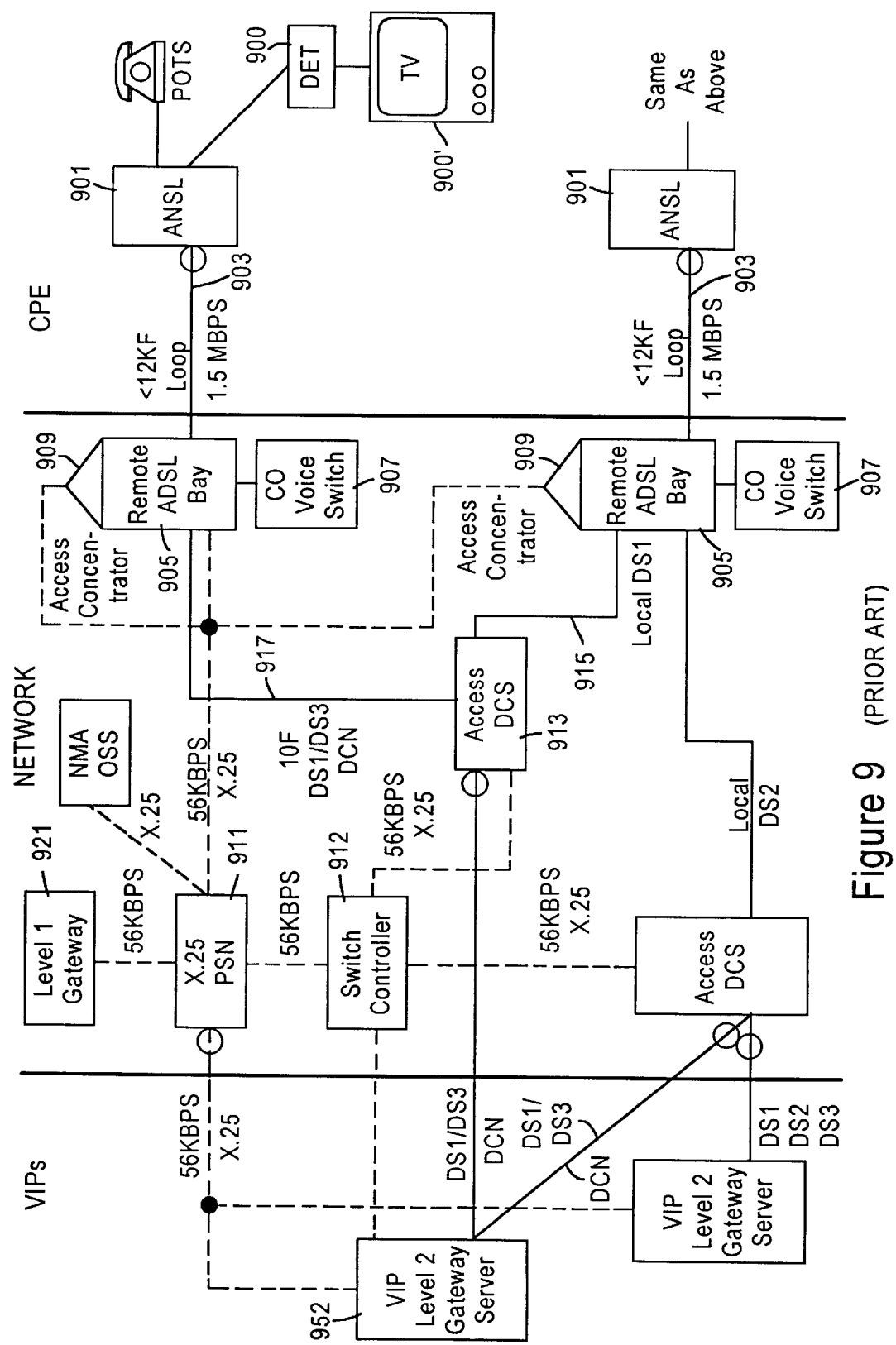
FIG. 9 is a block diagram of a prior art video on demand network of a type in which the invention disclosed is particularly useful.

FIG. 9 is a block diagram of one type of prior art broadband network for providing interactive services, such as video on demand, home shopping or purchasing, home banking, medical information, ticket ordering, gaming, etc. In the network shown the customer premises equipment (CPE) consists of a set top terminal type DET 100 and a telephone (POTS or ISDN). The connections to the central office utilize Asymmetrical Digital Subscriber Line (ADSL) technology, typically over twisted wire pair. The ADSL connection provides a 1.5 Mb/s downstream video information channel, a two-way telephone connection and a two-way 16 kbit/s control channel. The illustrated Video Dial Tone network architecture may use some form of fiber extension in the actual subscriber loops, to provide services to subscribers located more than 1.5 kilo-feet from a central office. In the illustrated network, the drop to the subscriber's premises is always a wired ADSL loop.

As shown in FIG. 9, the network interface module in the DET 800 connects to an ADSL multiplexer/demultiplexer 201 similar to the in-home ADSL unit in U.S. Pat. No. 5,247,347 to Litteral et al. The connection between the network interface module of the DET 800 and the in-home ADSL unit 901 may consist of an RJ48C line and connectors. Such a link comprises six wire pairs, two for the broadband data, two for upstream signaling and two for downstream signaling.

Each ADSL subscriber line 903 will connect to an ADSL bay 905 located in or associated with the subscriber's local central office. For each subscriber line 903, the ADSL bay 905 includes an ADSL multiplexer/demultiplexer similar to the central office ADSL unit in the above discussed Litteral et al. Patent. The ADSL bay 905 provides transport for voice signals on the subscriber loop to and from the associated voice switch 907. The ADSL bay 905 also connects to an access concentrator 909 for providing two-way signaling connections through an X.25 type packet switched data network 911. The ADSL bay 905 also receives broadband digital signals for downstream transport over the ADSL line 903 to each subscriber's premises from a digital cross connect switch 913, labelled "Access DCS" in the drawing. One ADSL line to the home carries one channel of video programming and provides a single output channel. The output channel can provide a video signal to a VCR or to the TV set 900'. The various Access DCS switches throughout the network are controlled by switch controller 912.

If the ADSL bay 905 is local, i.e. located in the same telephone company central office as the cross connect switch DCS 913, the ADSL bay 905 connects to the Access DCS 913 via an appropriate number of local DS1 connections 915. In service areas where an ADSL bay does not carry enough traffic to warrant an associated Access DCS, the ADSL bay will be located in a remote central office facility. Such a remote ADSL bay connects to the Access DCS 913 via a SONET type optical fiber link 917 providing an appropriate number of multiplexed channels to service the number of subscribers connected to the particular ADSL bay.

Video Information service Providers (VIP's) may access the downstream broadband portion of the system at a hub location (not shown) within a given LATA. The hub will not perform any switching. High capacity optical fiber links are aggregated at the hub to provide each VIP with a number of connections (e.g. one or more OC-3 links) from their respective video server to each Access DCS within the LATA.

The Access DCS 913 provides both point-to-point connections and point-to-multipoint connections. Individualized interactive services, such as Video On Demand, home shopping/purchasing and banking, use point-to-point connections wherein the Access DCS connects one broadband input port from a VIP's server to one output port going to the subscriber's ADSL line. Narrowcast and broadcast services utilize point-to-multi-point connections of one input port to a plurality of output ports.

The illustrated architecture of the Video Dial Tone network utilizes two levels of gateways, both of which will communicate with subscribers' DET's via the X.25 data network 911 and the signaling channel on the ADSL subscriber loops 903.

The level 1 gateway 921 performs a variety of network connectivity related functions, including communications port management of transmissions of information between subscribers and servers, processing of billing information and session management. Normally, each subscriber accesses the level 1 gateway (e.g. to select and access a particular VIP's server) by operation of a remote control device which causes the subscriber's DET 800 to transmit data signals to the level 1 gateway via the 16 Kb/s control channel and the X.25 packet switched data network 911. The level 1 gateway transmits one or more selection menus to the subscriber's DET 800 as screens of text data carried by the same path back through the network. In a typical scenario, the user would turn on the DET, and in response to data signals from the level 1 gateway 921, the DET 800 would display an initial selection menu on the associated television set 900'. The subscriber then would input a VIP selection, and in response to an appropriate data signal from the DET 800, the level 1 gateway 921 would instruct the various network components to set up an X.25 virtual circuit to the level 2 gateway of the selected VIP for signaling purposes and a direct downstream path from the VIP's server through the DCS 913 for video transmission. For simplicity, the VIP's gateway and server appear as a single unit 925.

A level 2 gateway provides a number of services for the Information Providers. These services include transmission of menus of available information to subscribers, searches of available information, targeted advertisement insertion, previews, trailers, etc. The level 2 gateway will download video or audio menus to each subscriber's DET for display, thereby allowing each subscriber to select desired information. Once a subscriber makes a selection, the level 2 gateway will signal the appropriate server to schedule transmission of the selected information through the established downstream video transmission path. The level 1 gateway accumulates connectivity charge information for purposes of billing each called VIP. The level 2 gateway records transactions, e.g. movies viewed, by each subscriber for billing purposes. The level 2 gateway also interacts with the DET 800 and controls the associated servers to download executable program code for storage in the DET system memory, as discussed above.

The Video Dial Tone network provides video on demand and closely related interactive multimedia services. For example, using the upstream data channel, the subscriber can send a request for a particular movie, and the VIP's server will retrieve and transmit that movie as an MPEG digital data stream on the 1.5 Mb/s downstream channel to the digital audio/video processor in the subscriber's DET 800. The DET converts the digital data stream to a signal for driving a standard television set for real time viewing of the movie by the subscriber. The performance of the DET functions are defined by the software in the DET system memory, thus each VIP can develop a different look and feel for their video on demand service by downloading different software to the DET memory.

Several other services offered may appear somewhat different to the subscriber but will function in exactly the same manner as video on demand. For example, one VIP might offer a 'Home Box Office' (HBO) on demand service. All HBO programming for a given month would be stored in that VIP's server and provided to individual HBO subscribers on an on- demand basis, rather than as a broadcast service. As another example, a subscriber playing a video game offered by the VIP 852 would obtain a video dial tone signaling link and a video transmission link through the network in exactly the manner described above. When the subscriber makes a move or entry in the game, the DET would send a control signal defined by the DET software upstream to VIP 952, and the VIP's game server would respond by generating and transmitting an appropriate video signal back to the DET and the subscriber's television set through the point to point connection through the DCS, the ADSL bay and the subscriber's line, exactly as was done for video on demand. The server might also transmit graphics overlay information back to the DET 100 through the X.25 network 911 and the signaling channel on the subscriber's ADSL line 903.

Specific examples of dynamic programming of the DET through the Video Dial Tone Network of FIG. 9 are discussed below.

With the present invention, when the subscriber turns on the DET 100, the loader routine and/or operating system will control wake up, and the DET will transmit an initial message to the level 1 gateway. In the network of FIG. 9, the message is carried over the 16 kbit/s signaling channel on the ADSL subscriber's line, and the access concentrator 909 packetizes the message and adds header information to facilitate transport through the X.25 network 911. In response to the initial message, the level 1 gateway transmits an IDL describing one or more pages of a VIP selection menu back to the DET 800 through the network and the signaling channel on the subscriber's line. Upon receipt of the menu data, the DET 800 would interpret the IDL, order the objects and create display an interactive multimedia initial selection menu on the subscriber's television set.

The subscriber may review the menu on their television set, and then input a selection using the infrared remote control device, either by moving a cursor to an appropriate point on the screen and hitting <ENTER> or by inputting digits followed by <ENTER>. In response to the VIP selection input, the DET 800 will transmit an appropriate data signal upstream through the network to the level 1 gateway 921.

The access concentrator 909 identifies the subscriber and includes an X.121 address for the X.25 network port assigned to the subscriber in the header of all signaling packets sent from the DET through the X.25 network. The level 1 gateway 921 receiving X.25 packets of DET signaling data therefore knows the X.121 address of the subscriber. The level 1 gateway 221 uses that information together with the VIP selection input to initiate an X.25 data call to the VIP's level 2 gateway to ask if the subscriber is a valid customer of the particular VIP. If the level 2 gateway indicates that the subscriber is valid, the level 1 gateway 921 instructs controller 912 to control the digital cross connect switch DCS 913 to set up a downstream broadband link from the VIP's file server to the subscriber's DET 800 and drops the X.25 communication link to the DET. At approximately the same time, the VIP's level 2 gateway initiates an X.25 call to the subscriber's DET 800. Completion of set-up of both the broadband link and the X.25 signalling link to the DET establishes a video session between the VIP's gateway and server system 952 and the subscriber's DET 800.

The MPEG system demultiplexer 827 circuitry recognizes packets in the MPEG data stream received over the broadband channel as video, audio or data. Video and audio packets are routed to the appropriate decoders 829, 831, but the data, such as interactive program objects, is routed to the microprocessor 810 within the CPU 805 for further processing.

As noted above, the same DET can be used in a variety of different networks, with only a substitution of a different network interface module to adapt the DET to each particular network. One key feature that will change as the DET is adapted to the different networks relates to addressing. In implementation of Video Dial Tone discussed in detail above, the video and downloaded programming data are transported in an MPEG 2 data stream which is digitally cross connected from the VIP's server to the subscriber's line. In contrast, the network disclosed in the Full Service Network application 08/250,792 cited above will utilize ATM switching to transport the MPEG streams.

Asynchronous transfer mode or "ATM" switching is an advanced, high-speed packet switching technology. MPEG (motion picture experts group) is a broad generic standard for video program compression, and MPEG 2 is a second generation compression standard for encoding each video program signal into a 6 Mbit/s bit stream. In ATM based networks, the MPEG 2 bit streams are converted into cellular payload data, and cell headers are added. The ATM cell header information includes a virtual circuit identifier/virtual path identifier (VCI/VPI) to identify the particular communication each cell relates to. For example, for broadcast signals, the VCI/VPI will identify a particular program channel. For a point to point transmission, e.g. for video on demand or for transmission of downloaded application programming software, the VCI/VPI in each header of the ATM cells would effectively identify specific end points of the virtual communication link. The identification of the receiving end of such a point to point link effectively addresses the ATM cells to the particular DET. In a network using such cell transmission the loader program would instruct the DET to process VCI/VPI information, e.g. to recognize the terminal's own ATM destination address in the incoming cell stream.

Figure 10:
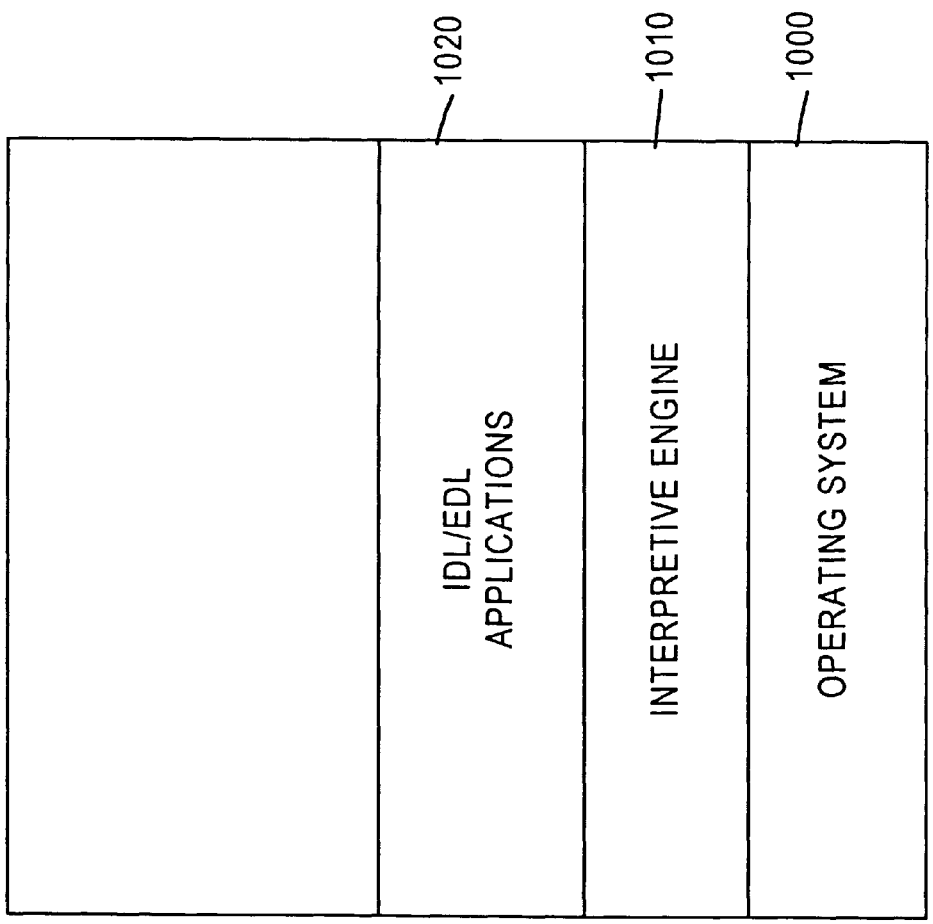
FIG. 10 is a diagram of the software architecture of the digital entertainment terminal when running IDL's of the kind utilized with the invention.

FIG. 10 illustrates the software architecture of the digital entertainment terminal when running IDL's in accordance with the prior art. Above the operating system 1000, is an interpretive engine 1010 which performs the run time function specified in FIG. 5G. On top of the interpretive engine sit the IDL or EDL applications 1020 for execution by the interpretive engine. The only difference between an IDL (interactive decision list) and an EDL (edit decision list) is that the IDL contains computer program objects where as the EDL does not. Nevertheless, the network execution of IDLs and EDLs is essentially that specified in connection with FIG. 5G.

Figure 11:
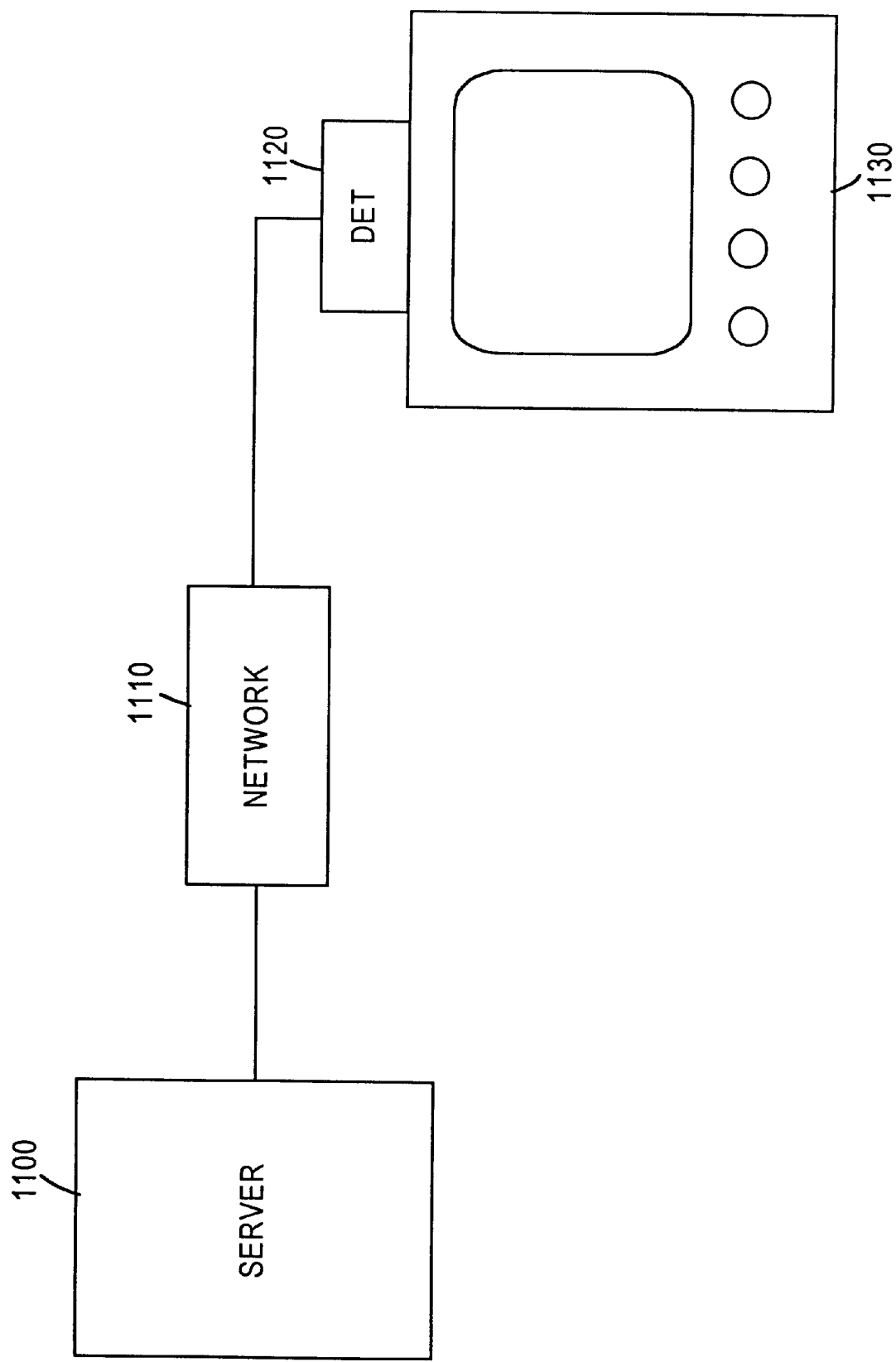
FIG. 11 is a schematic diagram illustrating how an IDL produces an interactive multimedia program application.

FIG. 11 is useful in understanding possible options available for execution of an IDL in accordance with the prior art. In one option, corresponding to that illustrated in FIG. 11, the interactive decision list is sent from server 1100 over network 1110 to the digital entertainment terminal 1120 where it is executed. When an IDL is executed, the DET takes the items on the list in order and requests the objects specified by the list item by sending a request over the network to the server. The objects are downloaded from server 1100 through the network 1110 to the DET 1120 where they are sequentially ordered, if necessary, and displayed, played back or executed in user equipment 1130. Although equipment 1130 is depicted as a television set, it represents an entire class of multimedia equipment designed for playback, display or the like. Such multimedia equipment may have many types of playback or display ongoing simultaneously.

In the scenario described in the previous paragraph, when the IDL is executed at the DET, the DET sends requests to the server for the objects. However, another mode of operation is possible. If the IDL is run at the server 1100, then the objects can be combined and only the combined integrated final application can be sent as a live program, with logically or physically separate channels for each medium to be controlled, over the network 1110 to the DET 1120 for display on the users device(s) 1130. The IDL, in this option, is not sent to the DET and the DET does not control the retrieval of objects from the server. Rather, the server controls a retrieval of objects and the assembly of those objects into a program which is then delivered to the end user for display at 1130.

Figure 12:
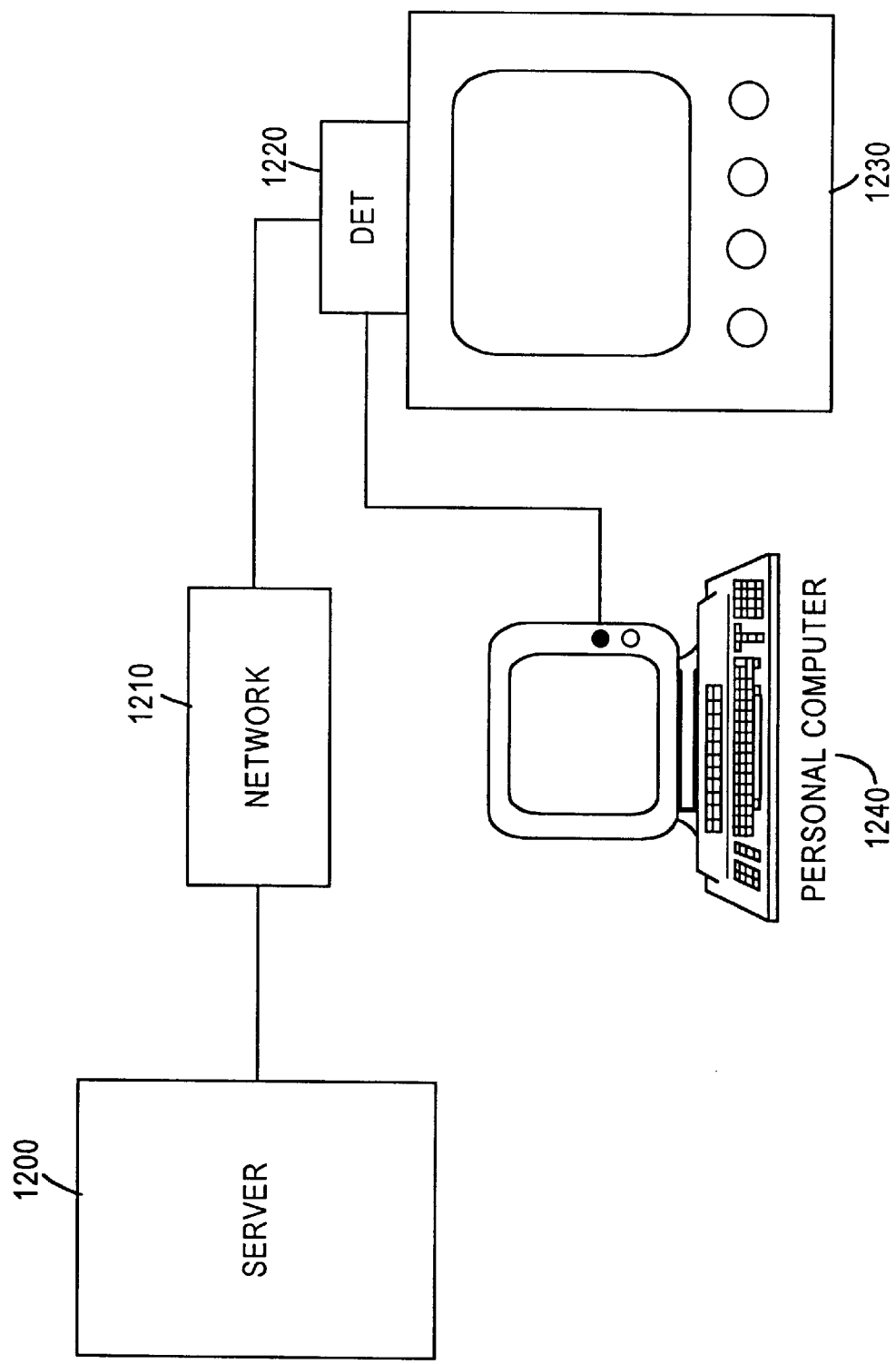
FIG. 12 is a diagram of a personal computer linked to a DET which is utilized for development of an interactive multimedia application in accordance with the invention.

FIG. 12 shows an extension of the arrangement of FIG. 11 in which a personal computer 1240 is connected to the DET 1220 over the data port. In this configuration, it is possible to run the full authoring tool development engine on personal computer 1240. The end user using the personal computer, can invoke the assets and objects of the server and integrate them into an interactive program. Thus, the end user becomes the producer of his or her own interactive multimedia applications. This gives the end user the same degree of control of the assets that a post-production user has in a post-production edit suite. Specifically, an end user can schedule the interactive modules of the invention in this way and create or modify the stop word list when eliminating undesirable language.

The degree of sophistication shown in prior art FIG. 12 is perhaps more than most users would find necessary. It is possible, as an alternative, to expand the capabilities of the DET to include a text editor, so that a user could, using a limited set of functionality, create his own custom menus to facilitate program selection and retrieval by creating or modifying an IDL using the text editor. Such a text editor could be a programmable object invoked by the user directly.

Figure 13:
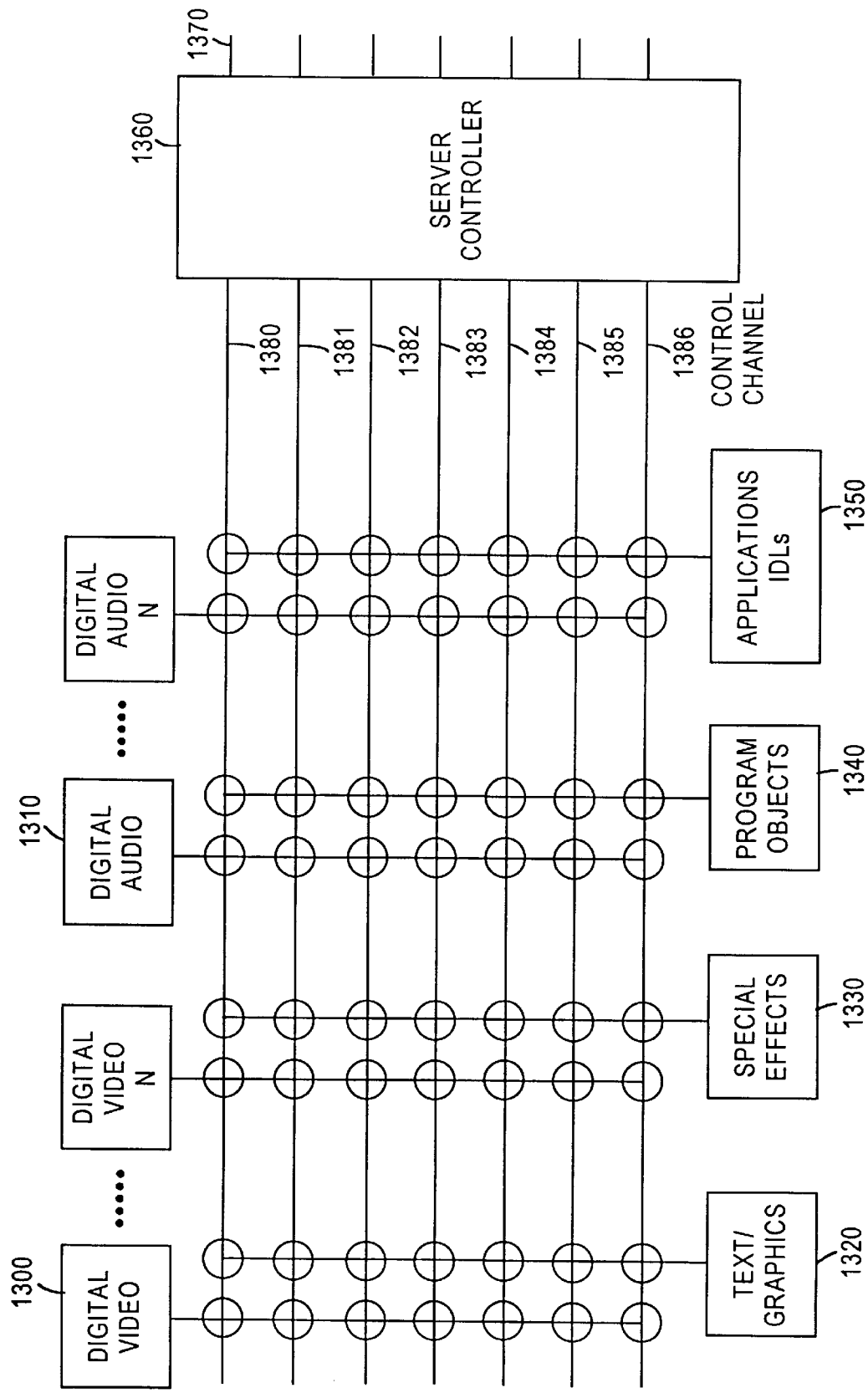
FIG. 13 is a representation of a server of the type utilized in the prior art to store multimedia assets and objects utilized in running an interactive multimedia application.

FIG. 13 illustrates a prior art server arrangement usable in connection with the invention. The server is controlled by computer 1360 which has one or more physical ports 1370 to the network. If only a single port is utilized, it should be clear that multiple sessions may be maintained over the single port as is common in digital communications. Associated with each controlling computer 1360 is a plurality of storage modules. Storage modules 1300 store video in digital form. Stores 1310 store audio in digital form. Store 1320 stores graphics in digital form. Store 1330 stores special effects. Store 1340 stores interactive objects and store 1350 stores interactive multimedia applications. Each of these stores may consist of part of the semiconductor memory space of the controlling computer or, alternatively, may constitute part of a hard disk drive associated with the controlling computer 1360 or may consist of one or more units of DASD. Although in FIG. 13 each of the stores is shown as connectable to each of several tracks 1380–1386 by a digital cross-point switch (which illustrates nicely the ability of each source to be associated with each track selectively), such switching may be done virtually, that is by multiplexing a single communications channel, such as that of a computer bus, controlled by the controlling computer 1360 to allocate the respective data to the correct destinations to achieve the functionality illustrated with the cross-point switch.

Figure 14:
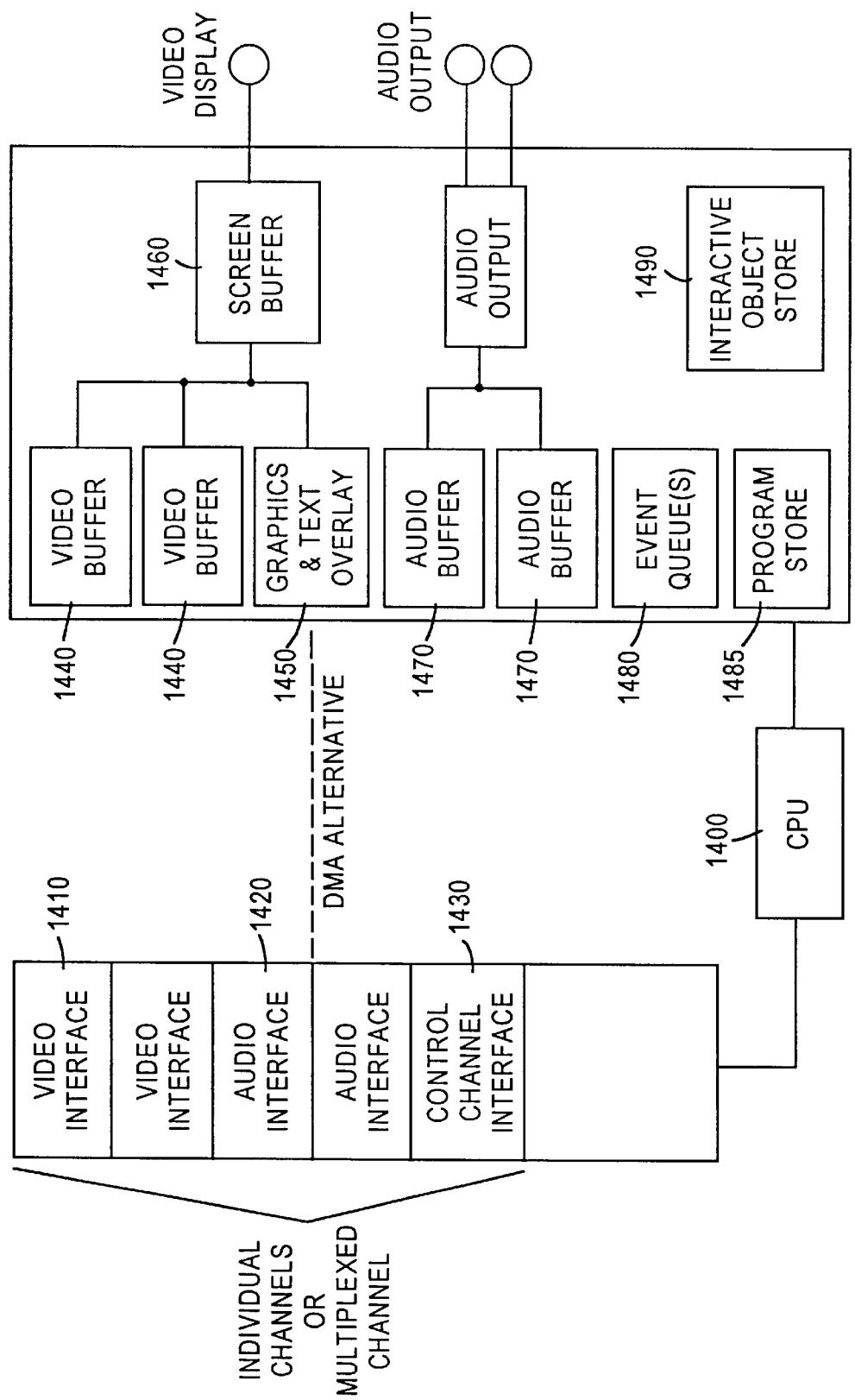
FIG. 14 is a diagram of a compositing computer utilized in the prior art to run an interactive multimedia application.
Figure 16:
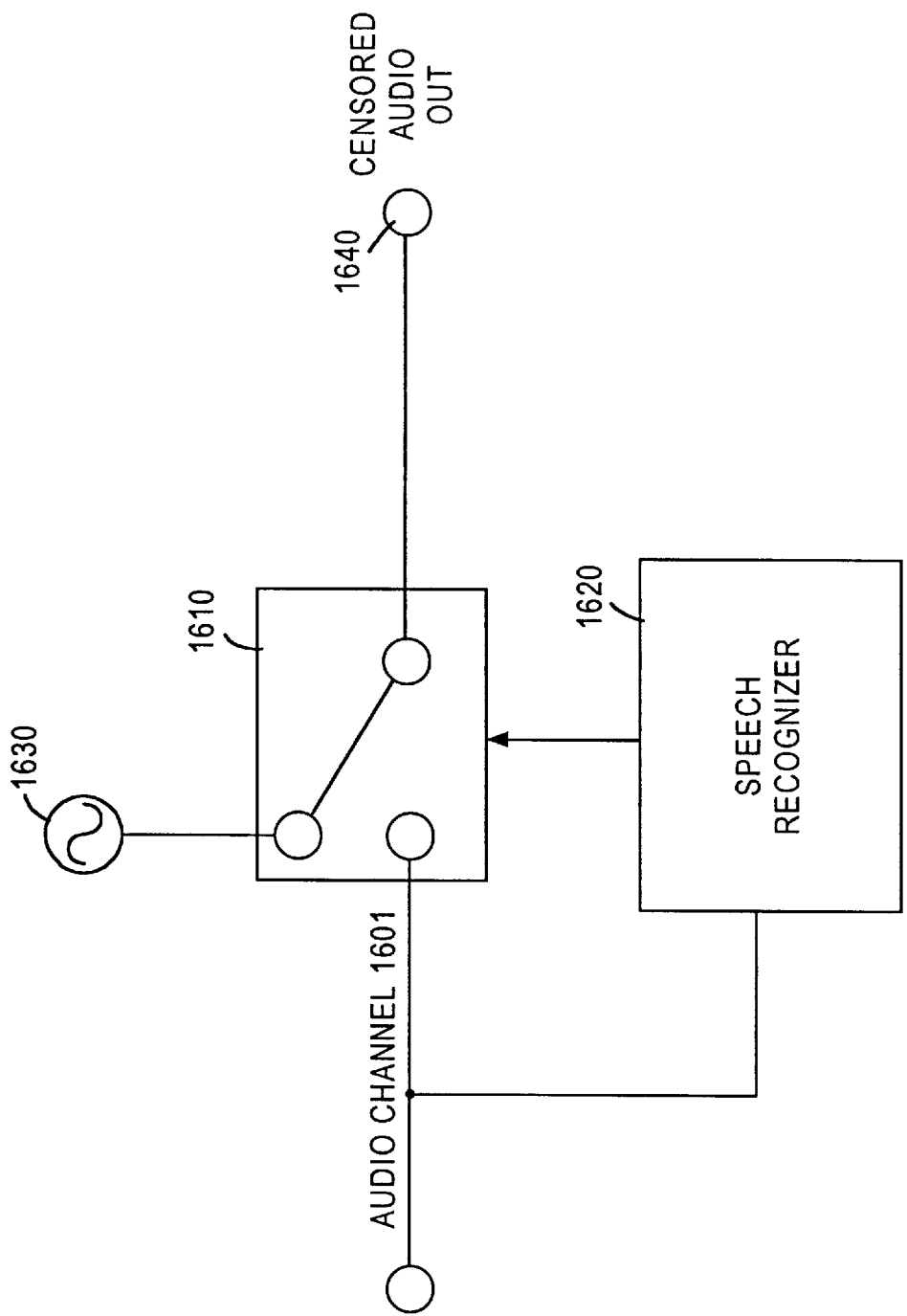
FIG. 16 is an illustration of a language editor according to the invention in which selected words from an audio channel are blocked when they are detected using speech recognition.

FIG. 14 illustrates functionally the operation of a particular computer which creates a composite of the objects retrieved from the server into a smooth flowing interactive multimedia application for use by an end user in accordance with the prior art. As the objects from various tracks are received at the compositing computer, they are allocated to buffers in accordance with their function. For example, video interfaces 1410 provide communications buffering for video information which is transferred to video buffers 1440. Similarly, audio interface buffers 1420 are communication buffers for receiving information needed by audio buffer 1470. The control channel buffer 1430 provides communications buffering for other types of data transfer such as a download of interactive objects, stored in 1490, event queues 1480 and program store 1485. Although the information flow from the communication buffers on the left to the processing memories on the right of FIG. 16 are shown as being managed by CPU 1600, it is clear that the incoming data over the communication link or links could be directly written into memory, bypassing the CPU, utilizing well known direct memory access (DMA) techniques. On the right hand side of FIG. 14, video information such as contained in video buffer 1440 or 1450 are selectively written, under program control to the screen buffer 1460 where a composite video image is created for display. Similarly, information received in audio buffer 1470 can be utilized either individually or jointly to provide audio output information for either left and right stereo channels or a single monaural channel. Program store 1485 contains the programs being run by CPU 1400. CPU 1400 as mentioned above, is a multitasking CPU capable of executing multiple programs concurrently. Interactive objects store 1490 is a section of the program store 1485 which contains the interactive objects downloaded from the server for execution. This architecture is just one of many which could be used to permit execution of IDLs to produce the final interactive multimedia application viewed by the end viewer. This architecture permits the process illustrated in FIG. 5G to run to create the end application. Although multiple components are shown here, essentially FIG. 14 shows a partitioning of the CPU memory space into certain functional areas and describes the interaction necessary to execute an IDL into a final application.

Figure 15:
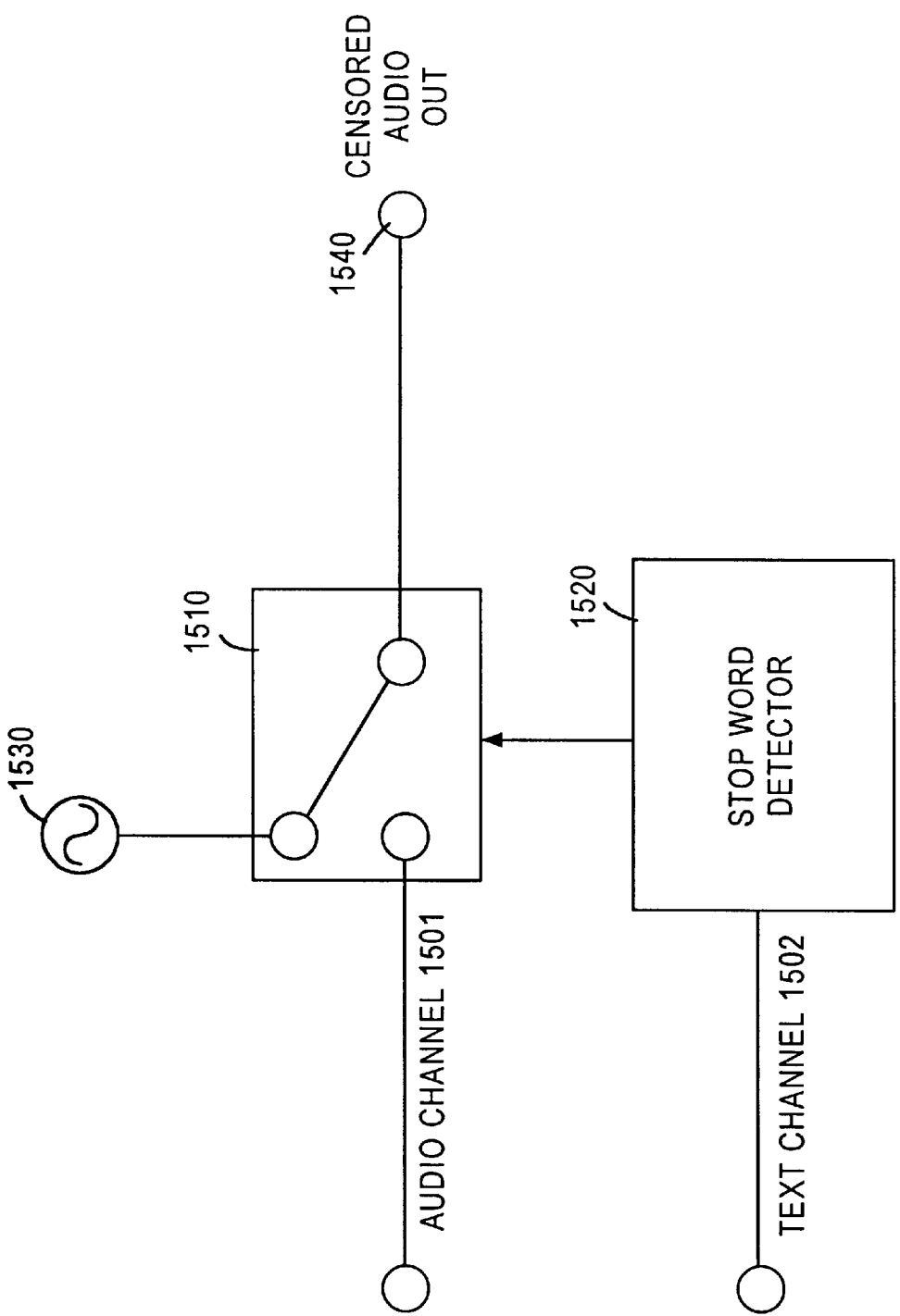
FIG. 15 is an illustration of a language editor according to the invention in which selected words from an audio channel are blocked when they are detected in an accompanying text channel.

FIG. 15 and 16 illustrate two examples according to the invention of interactive objects which might be invoked by a user. In a program in which an audio channel 1501 is paralleled by a text channel 1502 containing the ASCII text of the material in the audio channel, (e.g., closed captioned for the hearing impaired), the text is synchronized approximately with the audio. An interactive object 1520 is invoked to screen the text on the incoming text channel 1702 for the occurrence of certain undesirable words. Those words would be input to the interactive module (as, for example, additions to a stop list) and stored with the interactive module. When one of the words on the stop list is detected, that detection is utilized to open a switch 1510 in the audio channel to prevent the audio corresponding to the word from going through. In its place, a typical beep from tone source 1530 could be applied. Thus, the audio output at 1540 would be absent any of the words on the stop list. Minimal editing capabilities permit deletion or modification of stop list entries. Parents in certain families would find such a functionality desirable. The ability of a user to invoke the interactive module directly provides the user with the ability to customize the output of the application to suit his needs.

FIG. 16 is an alternative version of the circuit shown in FIG. 15 for situations in which no text channel accompanies the audio channel. In this case, the interactive module invoked by the end user is a speech recognizer 1820 which is utilized to detect certain words which the user finds offensive. The balance of FIG. 16 operates as discussed above with respect to FIG. 15.

Details of implementation, to the extent not described expressly herein may be found in pending Applications referred to above or in U.S. Pat. Nos. 5,317,732 or 5,307,456.

In this disclosure, there is shown and described only the preferred embodiment of the invention, however, as aforementioned, it is to be understood that the invention is capable of use in various combinations and environments and is capable of changes or modifications within the scope of the inventive concepts as expressed herein.

What is claimed is:

1. In a network arrangement for the delivery and presentation of multimedia applications represented in an interactive decision list, the network arrangement including a network, one or more file servers connected to the network, at least one of said file servers containing multimedia assets and at least one of said file servers containing one or more interactive program objects, at least one user location containing a set top box connected to the network and a process permitting a user to edit multimedia applications by invoking an interactive program object to perform the editing and configured for using interactive decision lists to activate retrieval of objects stored on the one or more file servers, for initiating playback of the objects retrieved and for initiating loading and execution of interactive program objects retrieved, all in a sequence corresponding to that represented on the interactive decision list; the network arrangement further including a text source of information which parallels audio information associated with said multimedia application, the improvement comprising: an interactive program object which monitors the text source and blocks the audio information from being played back when words specified by the user appear.

2. In a network arrangement for the delivery and presentation of multimedia applications represented in an interactive decision list, the network arrangement including a network, one or more file servers connected to the network, at least one of said file servers containing multimedia assets and at least one of said file servers containing one or more interactive program objects, at least one user location containing a set top box connected to the network and a process permitting a user to edit multimedia applications by invoking an interactive program object to perform the editing and configured for using interactive decision lists to activate retrieval of objects stored on the one or more file servers, or initiating playback of the objects retrieved and for initiating loading and execution of interactive program objects retrieved, all in a sequence corresponding to that represented on the interactive decision list;

the improvement comprising an interactive program object which performs speech recognition on audio of said multimedia application and blocks the audio when words specified by the user are recognized.

* * * * *